United States Patent
Evans et al.

(10) Patent No.: US 7,400,377 B2
(45) Date of Patent: Jul. 15, 2008

(54) DISPLAY HAVING PARTICULAR POLARISATION MODIFYING LAYER

(75) Inventors: Allan Evans, Oxford (GB); Martin D. Tillin, Oxfordshire (GB); Emma J. Walton, Oxford (GB)

(73) Assignee: Sharp Kabushiki Kaisha, Osaka (JP)

( * ) Notice: Subject to any disclaimer, the term of this patent is extended or adjusted under 35 U.S.C. 154(b) by 419 days.

(21) Appl. No.: 11/299,068

(22) Filed: Dec. 7, 2005

(65) Prior Publication Data
US 2006/0126156 A1   Jun. 15, 2006

(30) Foreign Application Priority Data
Dec. 14, 2004   (GB) .................................. 0427303.3

(51) Int. Cl.
G02F 1/13 (2006.01)
G02F 1/1335 (2006.01)
G02F 1/1343 (2006.01)

(52) U.S. Cl. ................... 349/194; 349/9; 349/141; 349/61

(58) Field of Classification Search .............. 349/194, 349/9, 141, 61; 359/320
See application file for complete search history.

(56) References Cited

U.S. PATENT DOCUMENTS

| | | | | |
|---|---|---|---|---|
| 5,825,436 A | * | 10/1998 | Knight | 349/16 |
| 5,831,698 A | * | 11/1998 | Depp et al. | 349/64 |
| 5,877,829 A | * | 3/1999 | Okamoto et al. | 349/74 |
| 6,211,930 B1 | * | 4/2001 | Sautter et al. | 349/66 |
| 6,271,896 B2 | * | 8/2001 | Moseley et al. | 349/15 |
| 6,437,915 B2 | * | 8/2002 | Moseley et al. | 359/465 |
| 2002/0001128 A1 | * | 1/2002 | Moseley et al. | 359/465 |
| 2006/0082702 A1 | * | 4/2006 | Jacobs et al. | 349/96 |

* cited by examiner

*Primary Examiner*—Mike Qi
(74) *Attorney, Agent, or Firm*—Renner, Otto, Boisselle & Sklar, LLP

(57) ABSTRACT

A display is provided for providing a restricted viewing mode, for example a private viewing mode where the display may be viewed from a limited region of space by a single viewer and not by other people outside the viewing region. The display comprises a source of polarised light and an output polariser. Between these are provided a controllable pixellated spatial polarisation modulating layer, for example of the liquid crystal type. Also, a polarisation modifying layer is provided between the polarisers and is spaced from the modulating layer. The modifying later comprises a plurality of sets of regions with the regions of each set having the same polarisation modifying effect and the regions of different sets having different polarisation modifying effects. The light path between the modulating layer and the modifying layer is polariser-free. A controller supplies modified image data to compensate for the effect of each region through which light from one or more associated pixels passes to the viewing region so that a viewer in the viewing region sees the displayed image. Outside the viewing region, light passes through regions for which the pixels receive uncompensated data so that the image is obscured or corrupted and is not visible. The modifying layer may be disablable in order to provide a public viewing mode for viewers throughout a wide viewing region.

34 Claims, 13 Drawing Sheets

Opaque material 2
Transparent material 1
Rays making large angles with the layers are absorbed
Rays nearly parallel to the layers are transmitted linear polariser 5 (transmission axis 0 degrees)
transparent isotropic material 11
half-wave retarder (principal axis at 45 degrees) 12
linear polariser 6 (transmission axis 90 degrees)

FIG 3
A      
B  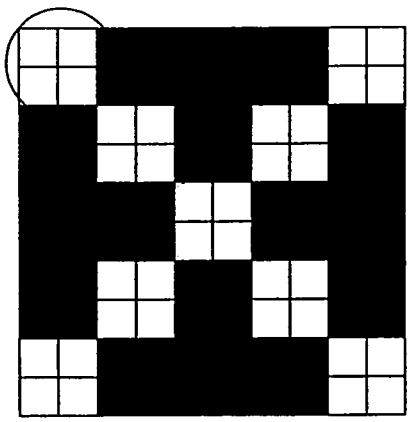   C  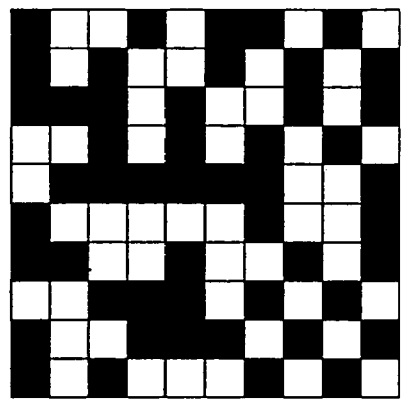
D  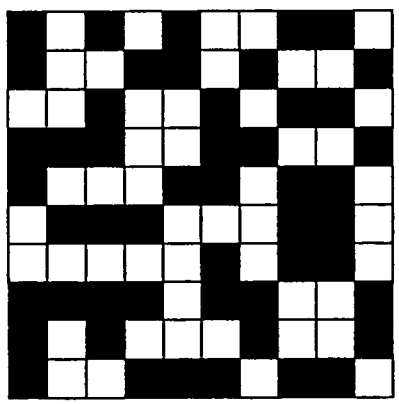   E  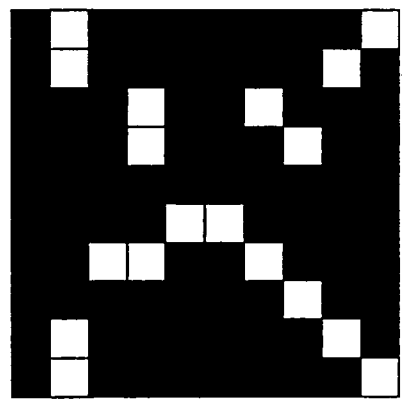
F  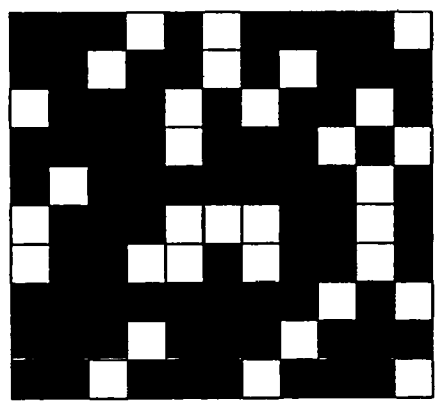

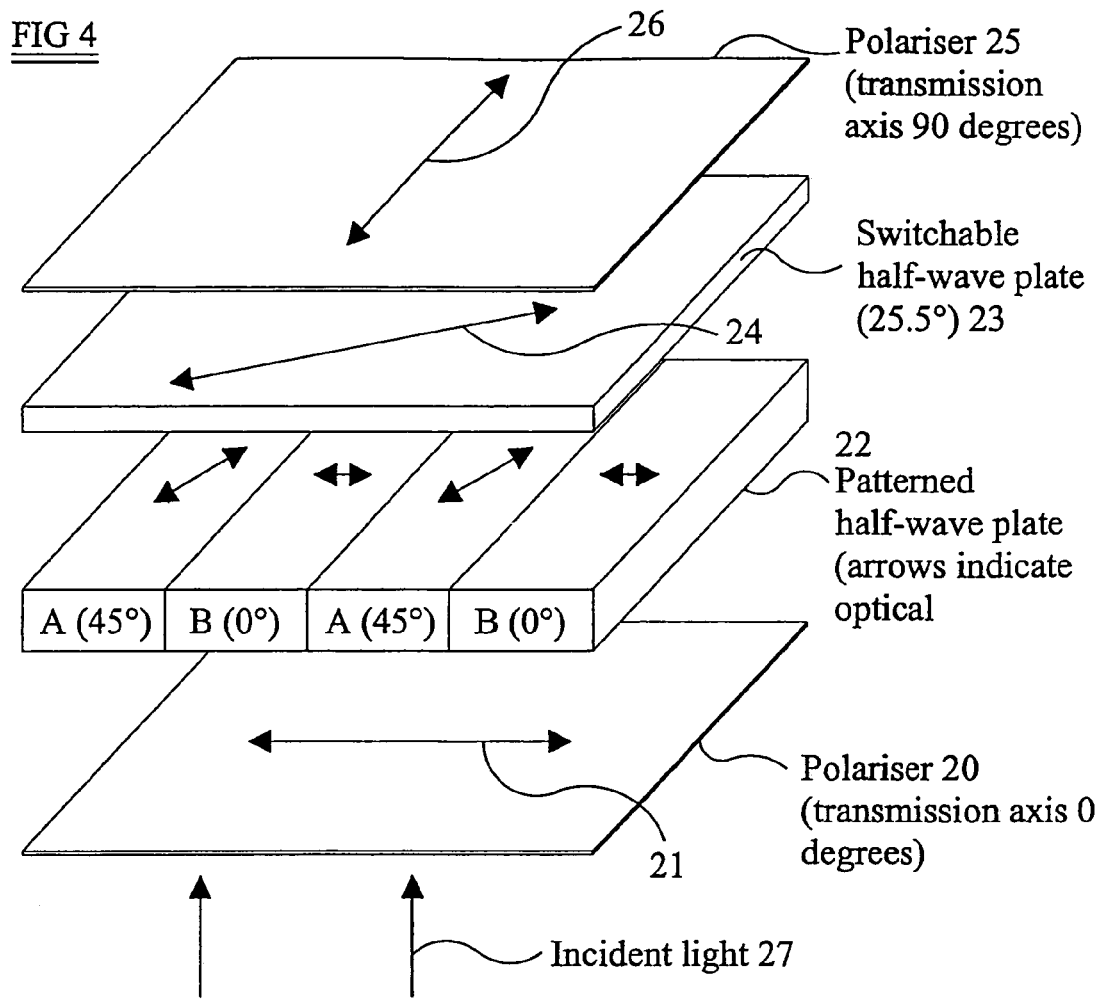
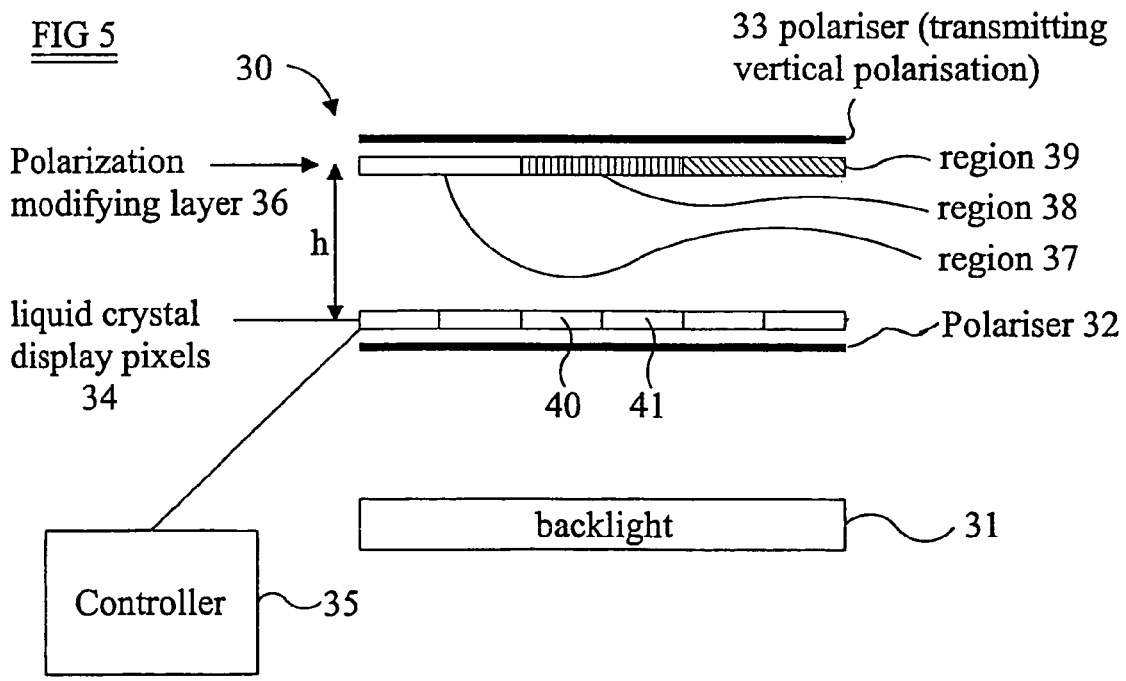

FIG 6
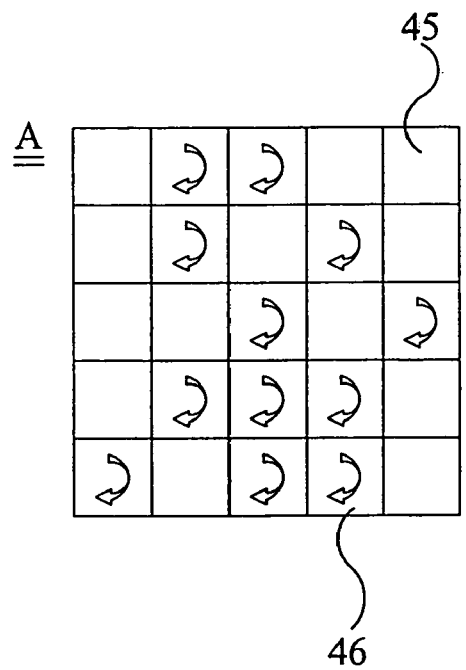
45
46
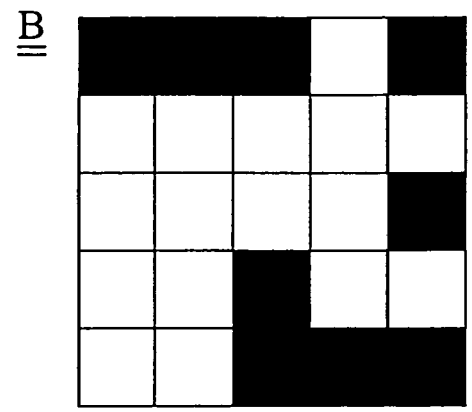
A
B
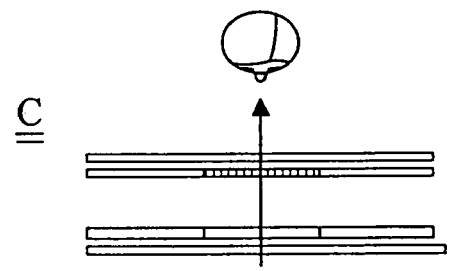
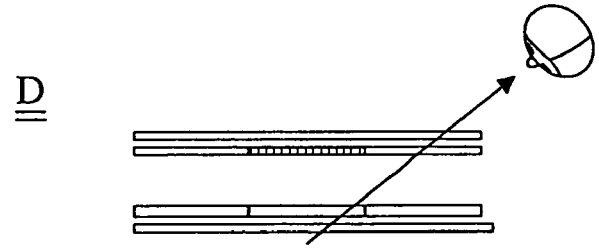
C
D
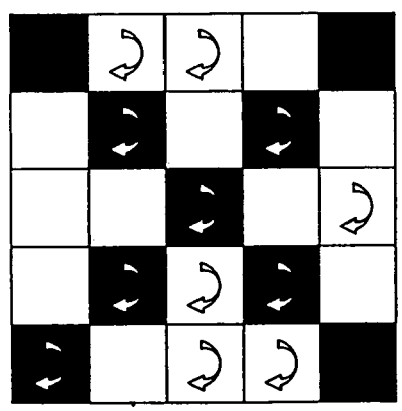
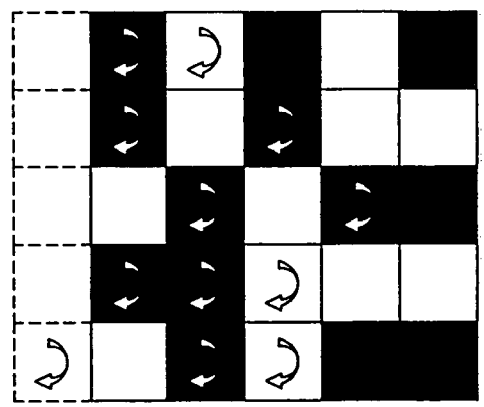

| R | G | B | R | G | B | R | G | B | R | G | B |
|---|---|---|---|---|---|---|---|---|---|---|---|
| R | G | B | R | G | B | R | G | B | R | G | B |

B

| R | G | B | R | G | B | R | G | B | R | G | B |
|---|---|---|---|---|---|---|---|---|---|---|---|
|   |   | H |   |   |   |   |   | H |   |   | H |
| R | G | B | R | G | B | R | G | B | R | G | B |
|   |   | H |   |   |   |   |   | H |   |   | H |

C

| R | G | B | R | G | B | R | G | B | R | G | B |
|---|---|---|---|---|---|---|---|---|---|---|---|
|   |   | H |   |   |   |   | H |   |   |   | H |
| R | G | B | R | G | B | R | G | B | R | G | B |
|   |   | H |   |   |   |   | H |   |   |   | H |

D

| R | G | B | R | G | B | R | G | B | R | G | B |
|---|---|---|---|---|---|---|---|---|---|---|---|
|   |   | H |   |   |   |   |   | H |   |   | H |
| R | G | B | R | G | B | R | G | B | R | G | B |
|   |   | H |   |   |   |   |   | H |   |   | H |

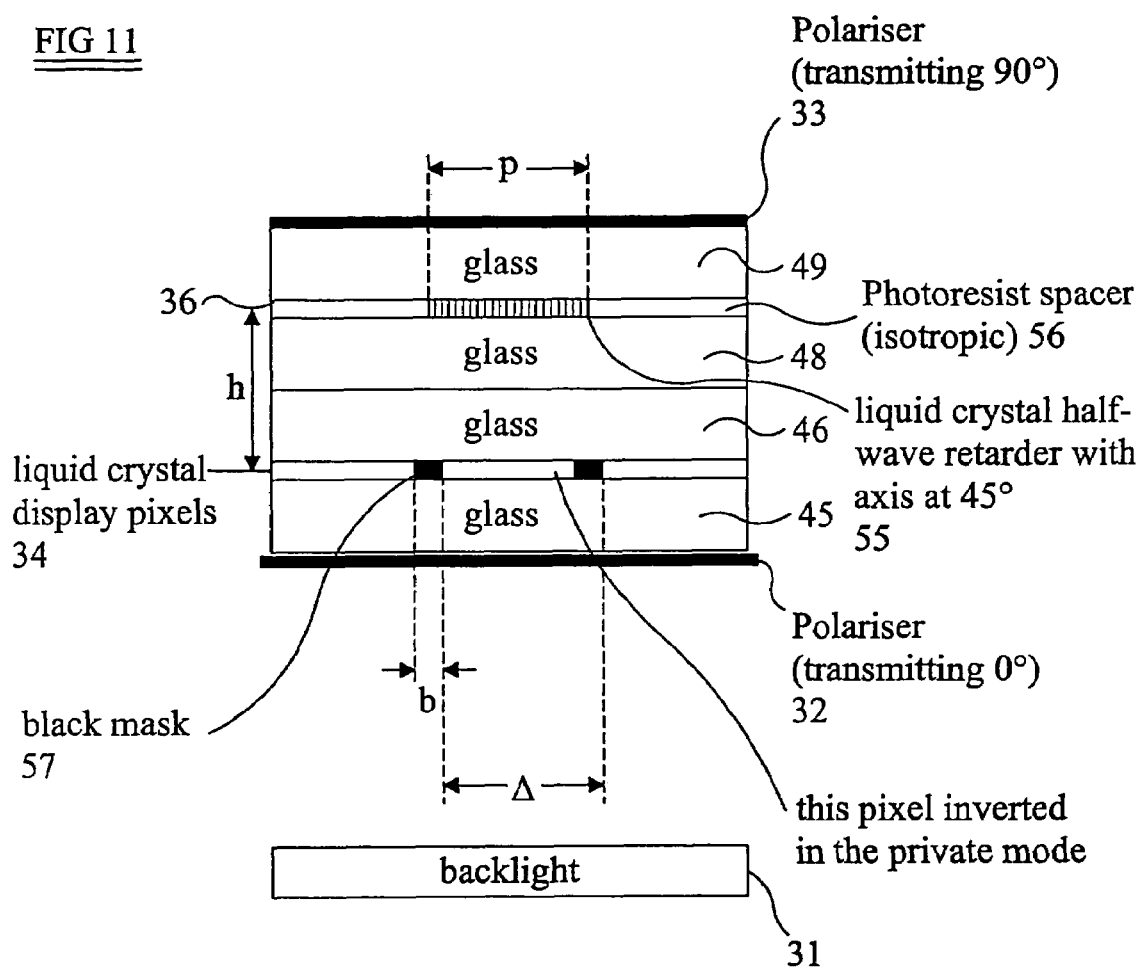
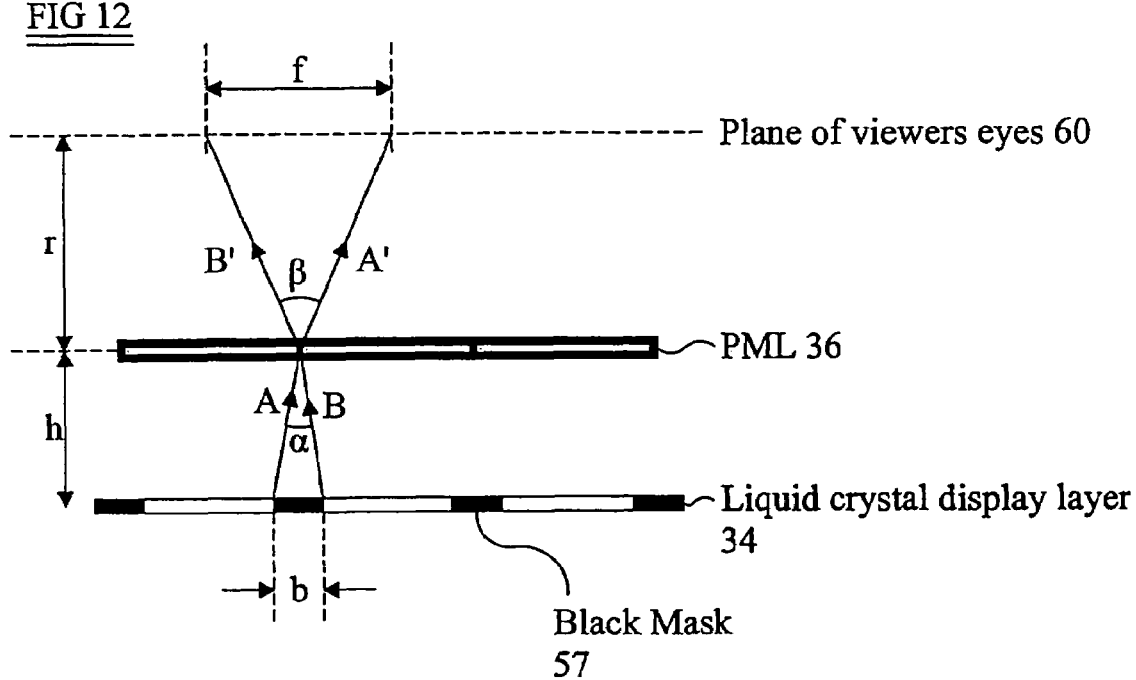

FIG 13
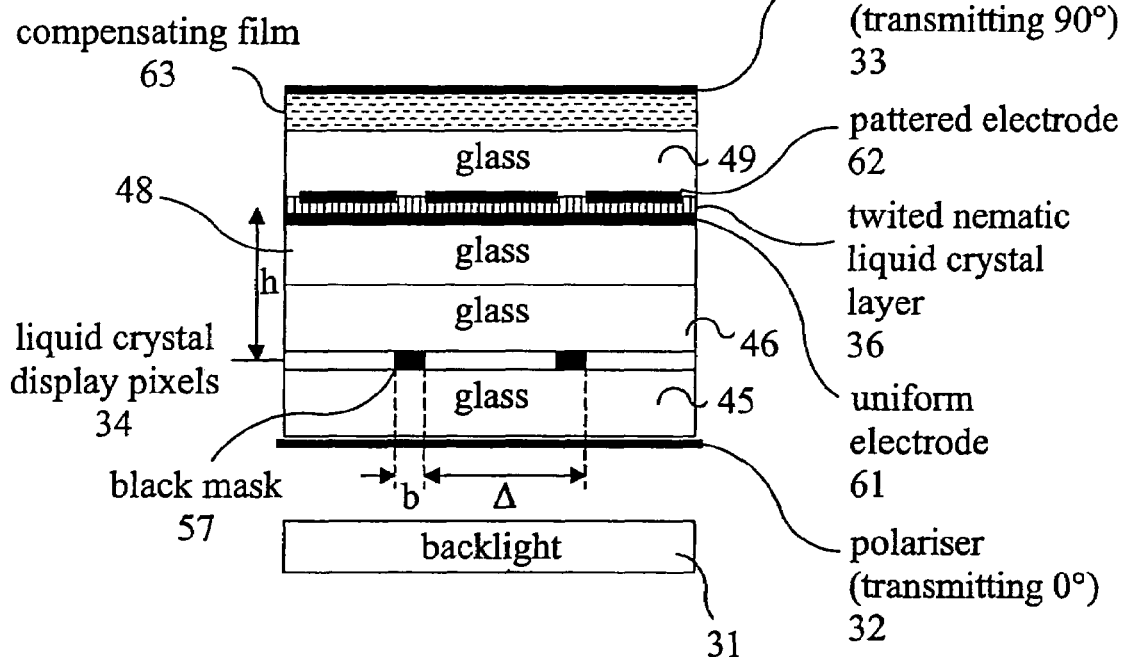
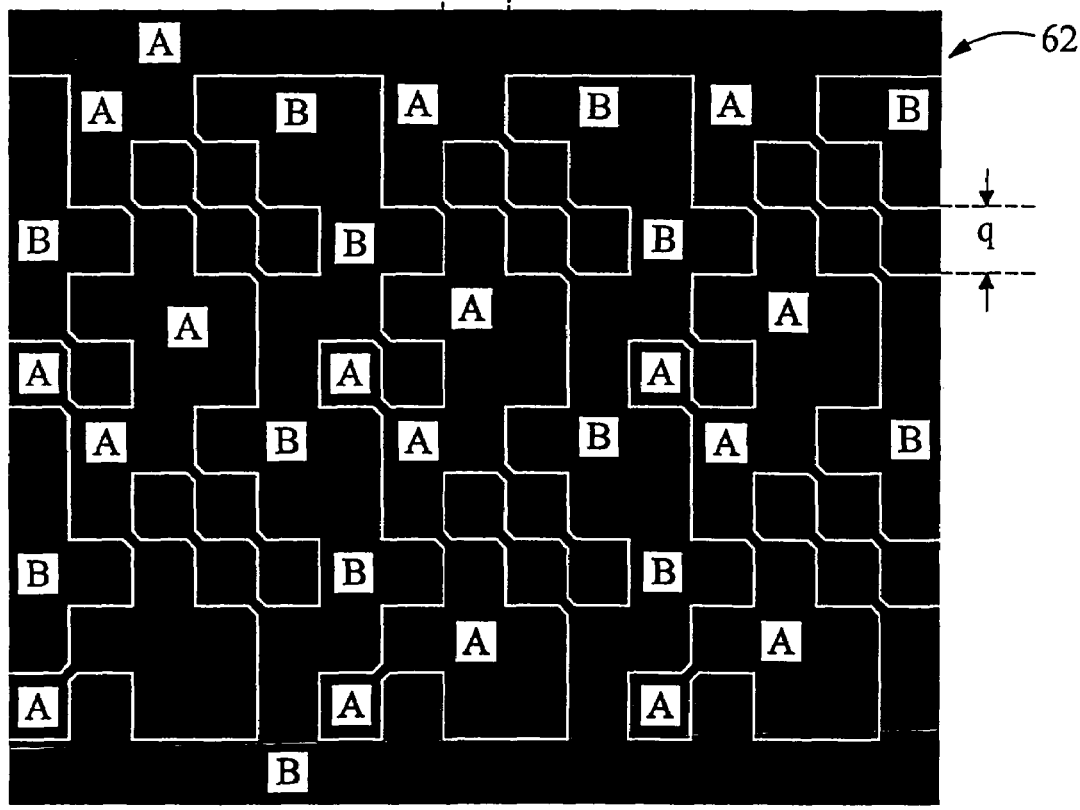

FIG 14
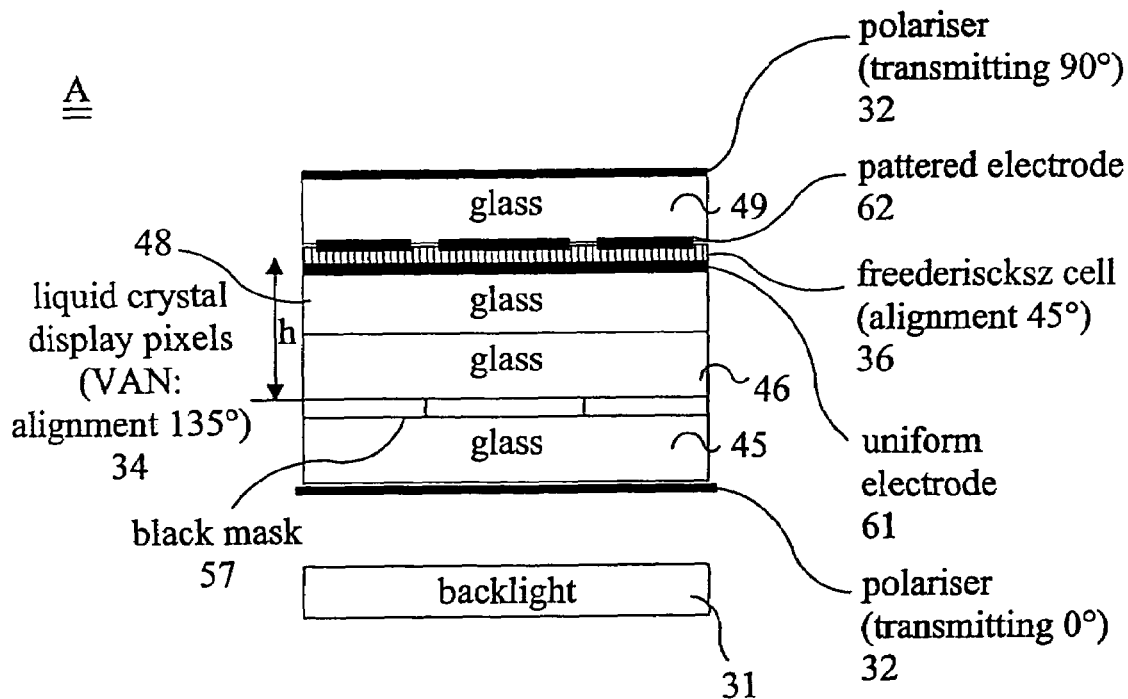
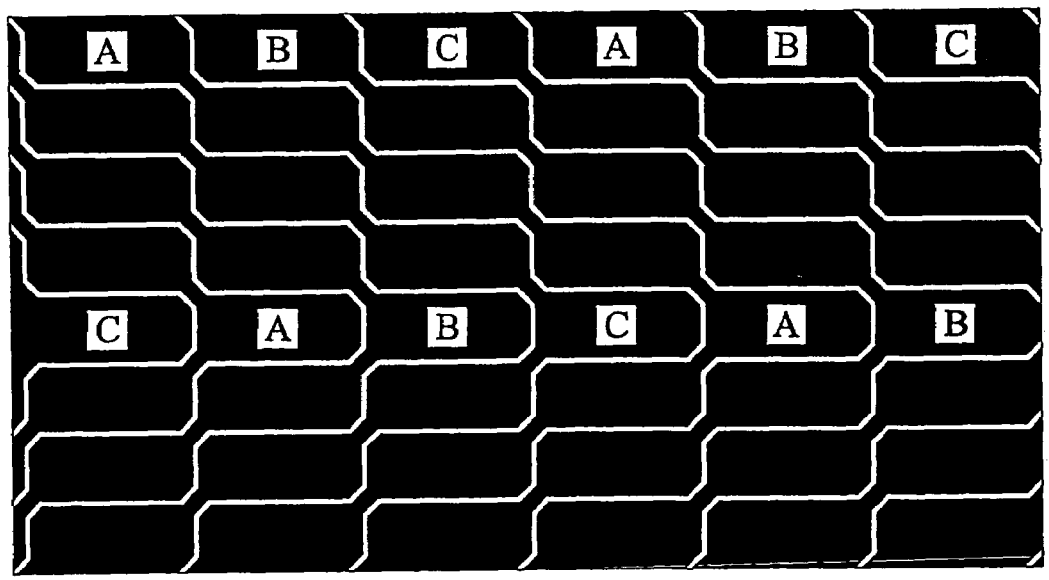

FIG 15
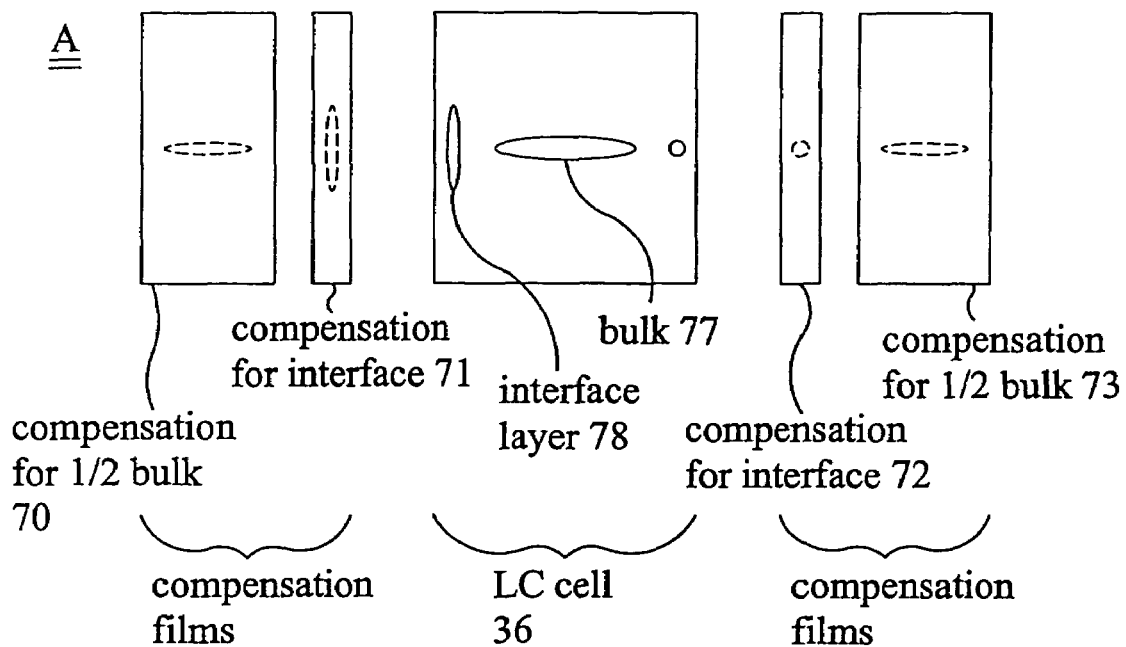
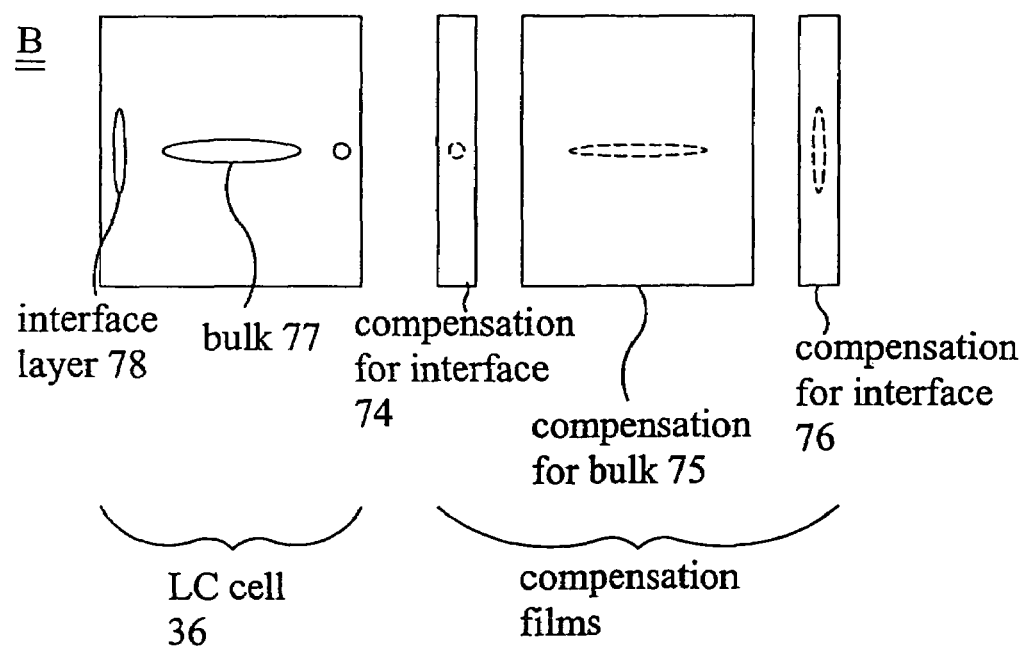

FIG 16
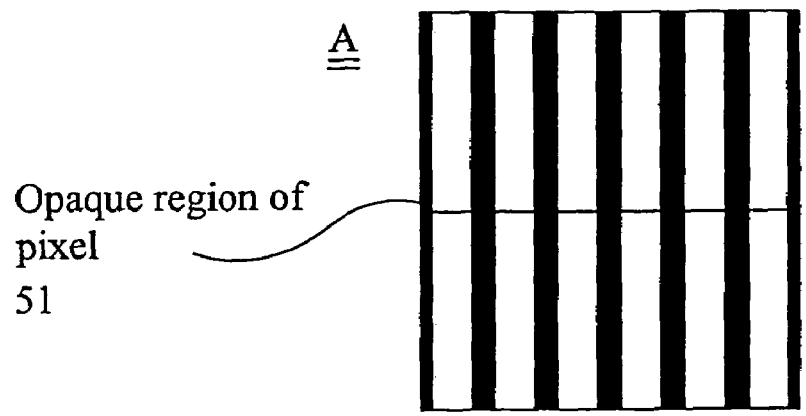
Opaque region of pixel 51
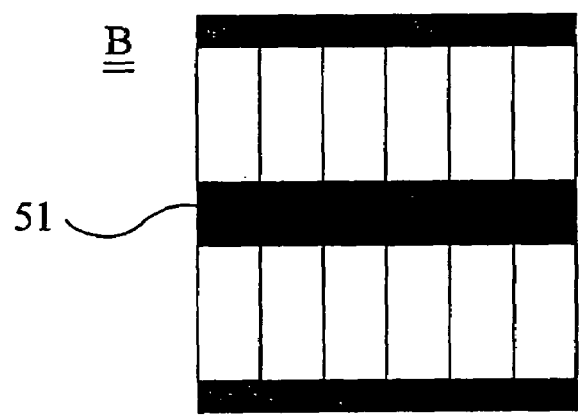
51
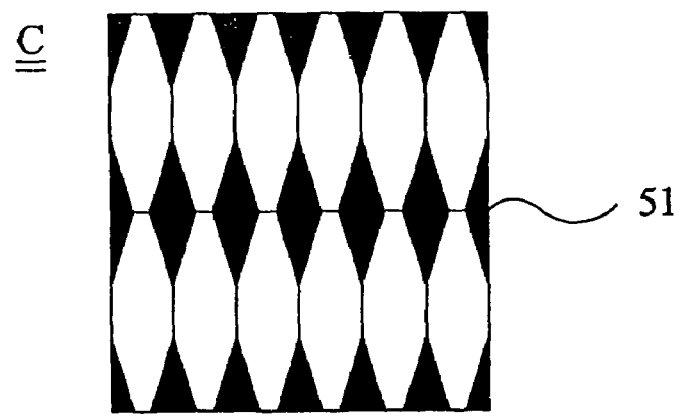
51

DISPLAY HAVING PARTICULAR POLARISATION MODIFYING LAYER

TECHNICAL FIELD

The present invention relates to a display for providing a restricted viewing mode. Such a display may, for example, be used to provide a private viewing mode with a relatively narrow viewing angle. Another example of use of such a display is to provide an optical decoding mode for viewing encoded image data. Such displays may be switchable between the restricted mode and an alternative mode, such as a public viewing mode with a relatively wide viewing angle.

BACKGROUND

A number of devices are known which restrict the range of angles or positions from which a display can be viewed. U.S. Pat. No. 6,552,850 discloses a method for the display of private information on a cash dispensing machine. Light emitted by the machine's display has a fixed polarisation state. The machine and its user are surrounded by a large screen of sheet polariser which absorbs light of that polarisation state but transmits the orthogonal state. Passers-by can see the user and the machine but cannot see information displayed on the screen.

A versatile method for controlling the direction of light is a 'louvred' film as illustrated in FIG. 1 of the accompanying drawings. The film comprises alternating transparent and opaque layers 1 and 2 in an arrangement similar to a Venetian blind. Like a Venetian blind, it allows light to pass through it when the light is travelling in a direction 3 parallel or nearly parallel to the layers, but absorbs light travelling at large angles 4 to the plane of the layers. These layers 1, 2 may be perpendicular to the surface of the film or at some other angle. Methods for the production of such films are disclosed in USRE27617, U.S. Pat. Nos. 4,766,023 and 4,764,410.

Other methods exist for making films with similar properties to the louvred film, for example, as disclosed in U.S. Pat. Nos. 5,147,716 and 5,528,319.

U.S. Pat. No. 6,239,853 discloses a privacy device based on a different principle. The device is shown in FIG. 2 of the accompanying drawings and comprises two linear polariser sheets 5, 6 whose transmission axes 7, 8 are orthogonal. Between the sheets 5, 6 are two layers 9, 10, each of which comprises alternating stripes of isotropic material 11 and half-wave retarder 12. The layers 9, 10 are arranged so that any ray of light passing through the device in the direction perpendicular to its plane passes through exactly one half-wave retarder 12. The device is therefore substantially transparent to such rays (except for any absorption in the first polariser). If the device is placed on the front of a flat-panel display, then a viewer on the central axis will be able to read the display.

As the viewer moves to the left or right, a proportion of rays which would otherwise have reached the viewer passes through either no or two retarders 12, and so is absorbed. The device therefore partially obscures the display to off-axis viewers and provides privacy.

This device has the following disadvantages. It requires four extra layers, adding considerably to the cost and bulk of the display. It is not switchable to a public mode. As the user's head moves further to the side, past the point where all light is blocked, the display becomes visible again. In fact, light is completely blocked to viewers only at isolated points on a left-right axis.

A different method for restricting the viewing angle of a display is described in 'Secure information display with limited viewing zone by use of multi-color visual cryptography', H. Yamamoto et al, *Optics Express* v12, pp 1258-1270 (2004) and 'Use of visual cryptography to limit viewing zone of information display', H. Yamamoto et al, *Proceedings of the 10th International Display Workshops* (Fukuoka, Japan, 2003), paper VHF3-2.

The method is known as 'visual cryptography'. The pixels of a display panel are divided into groups. In the example shown in FIG. 3 of the accompanying drawings, the display is monochrome and each group is a square of four pixels. One such square is indicated by a circle at (b). A mask shown at (c) is placed in front of the display and separated from it by a small distance. The portion of the mask in front of each pixel group contains a pattern which obscures two of the four pixels in the group. The six possible patterns are shown at (a). The choice of which pixels are obscured in each group is made randomly when the mask is designed.

An image which is to be displayed on the device (in this case, a letter 'X') is shown at (b). The image data sent to the display panel is shown at (d). Again, one of the six possible patterns at (a) is displayed in each group of four pixels. The choice is made so that two white pixels are visible in each group which is white in the intended image, and no white pixels are visible in each group which is black in the intended image. When the panel is viewed through the mask, a viewer in the central viewing position sees exactly two of the pixels in each group of four. For white groups in the 'X', these pixels are white but, for black groups in the 'X', these pixels are dark.

How the panel appears through the mask to a viewer in the central position is shown at (e). The 'X' is visible with considerable loss in image quality and brightness. When the user's head moves away from the central position, parallax causes different pixels to be exposed and the viewer sees a random dot pattern, for example as shown at (f).

This method provides privacy, but has a number of disadvantages. The brightness of the display is reduced because the mask absorbs half the light reaching it. The effective number of pixels in the display is halved. Also the random mask pattern causes the display to have a mottled appearance.

The method may be extended to colour displays, as described in the first paper mentioned above, but the disadvantages remain in this case.

Visual cryptography devices have a second application. Because the image on a display is intelligible only when the mask is present, the mask may function as a key in a cryptographic system. For example, the data to be displayed on the display panel may be sent by a transmission channel which has no security, such as a television broadcast, while the amplitude mask is possessed only by the intended receiver of the information.

There are also some applications where a user wishes to use a non-secure terminal to view information from a secure information source. For example, a user may wish to use a computer owned by a third party (for example, in a hotel or in some public place) to access bank account details. In this situation, it is useful to send an encrypted image to a display which can be read only when the user places a mask over the display. The 'visual cryptography' scheme may be used for this application if the user carries the mask.

The devices described above may be placed either in front of a display panel or between a transmissive display panel and its backlight to restrict the range of angles from which the display can be viewed. In other words, they make a display 'private'. However none of them gives a method by which the privacy function can be switched off to allow viewing from a wide range of angles.

US 2002/0158967 shows how a light control film can be mounted on a display so that the light control film can be moved over the front of the display to give a private mode or mechanically retracted into a holder behind or beside the display to give a public mode. This method has the disadvantages that it contains moving parts which may fail or be damaged and that it adds bulk to the display.

A method for switching from public to private mode with no moving parts is to mount a light control film behind the display panel and to place a diffuser which can be electronically switched on and off between the light control film and the panel. When the diffuser is inactive, the light control film restricts the range of viewing angles and the display is in private mode. When the diffuser is switched on, it causes light travelling at a wide range of angles to pass through the panel and the display is in public mode. It is also possible to mount the light control film in front of the panel and place the switchable diffuser in front of the light control film to achieve the same effect.

Switchable privacy devices of these types are disclosed in U.S. Pat. Nos. 5,831,698, 6,211,930 and 5,877,829. They share the disadvantage that the light control film always absorbs a significant fraction of the light incident upon it, whether the display is in public or private mode. The display is therefore inefficient in its use of light. Since the diffuser spreads light through a wide range of angles in the public mode, these displays are also dimmer in public than in private mode unless the backlight is made brighter to compensate.

Another disadvantage relates to the power consumption of these devices. In the public mode of operation, the diffuser is switched off. This often means that voltage is applied to a switchable polymer-dispersed liquid crystal diffuser. More power is therefore consumed in the public mode than in the private mode. This is a disadvantage for mobile devices which are used for most of the time in the public mode and which have limited battery power.

A third known method for making a switchable public/private display is disclosed in U.S. Pat. No. 5,825,436. The light control device in this patent is similar in structure to the louvred film described earlier. However, each opaque element in the louvred film is replaced by a liquid crystal cell which can be electronically switched from an opaque state to a transparent state. The light control device is placed in front of or behind a display panel. When the cells are opaque, the display is in its private mode; when the cells are transparent, the display is in its public mode.

A first disadvantage of this method is in the difficulty and expense of manufacturing liquid crystal cells with an appropriate shape. A second disadvantage is that, in the private mode, a ray of light may enter at an angle such that it passes first through the transparent material and then through part of a liquid crystal cell. Such a ray will not be completely absorbed by the liquid crystal cell and this may reduce the privacy of the device.

Another method for making a switchable public/private display device is disclosed in JP2003-233074. This device uses an additional liquid crystal panel which is segmented. Different segments of the panel modify the viewing characteristics of different areas of the display in different ways, with the result that the whole display panel is fully readable only from a central position. In particular, the additional liquid crystal layer is segmented into two sets of regions. The liquid crystal is aligned differently in the two sets of regions so that, for a part of the main LCD panel viewed through regions in the first set, brightness decreases sharply as the viewer moves to the left. This decrease in brightness happens because, when light passes through a cell in the additional layer at an angle to the normal, the angle between the electric field vector and the LC director is different from that for rays passing through in the normal direction and so the polarisation changes in a different way. Similarly, when part of the main LCD panel is viewed through a region in the second set, the brightness decreases sharply as the viewer moves to the right. Changes in the display appearance as the user moves are therefore due to angle-dependence in the polarisation-modifying characteristics of the layer.

A disadvantage of this method is that the whole of the display is never obscured, so the privacy provided is not complete. Because of this limitation, the level of privacy for images or for text in large font sizes is not good.

A disadvantage of nearly all previously known privacy devices is that they are less effective under very low ambient light conditions. The only exception to this rule is the 'visual cryptography' method. All other previously known methods rely on preventing light from reaching unwanted viewers. Any method of doing this leaks a small amount of light, especially in areas close to the boundary between the excluded and permitted viewing zones. Under very low ambient lighting, unwanted viewers may be able to perceive this light and therefore read the display.

Autostereoscopic displays achieve a three-dimensional stereo effect by allowing the left eye of the user to see one image while the right eye sees another without the user wearing specially designed glasses. One widely-used method for electronic displays is the parallax barrier described, for example, in the book 'Stereoscopy' by N. A. Valyus (Focal Press, 1966), where a screen with opaque and transparent portions is placed close to the display panel, either in front or behind. When the user is in the correct position, the screen prevents light passing through some of the pixels of the display from being seen by the left eye and prevents light passing through the rest of the pixels from being seen by the right eye.

When ordinary (two-dimensional) images are shown on such a display, it is useful to switch the parallax barrier off, that is, make the entire barrier transparent. One method for achieving this is disclosed in U.S. Pat. No. 6,055,103 and EP0887666. The method uses a patterned retarder, which cannot be switched on and off, and a single switchable wave-plate.

Such a switchable parallax barrier is illustrated in FIG. 4 of the accompanying drawings and comprises an input polariser 20 whose transmission axis 21 is oriented at 0°. A patterned half wave-plate 22 comprises regions A whose optic axes are oriented at 45° to the axis 21 whereas regions B have optic axes oriented parallel to the axis 21. A uniform switchable half wave-plate 23 is switchable between the state illustrated in FIG. 4 with its optic axes 24 oriented at 22.5° to the axis 21 and another state in which the half wave-plate is effectively disabled. An output polariser 25 has its transmission axis 26 oriented at 90° to the axis 21. The switchable parallax barrier may be disposed in front of or behind a display panel to permit switching between an autostereoscopic 3D mode and a 2D or single view mode.

When the switchable wave-plate 23 is switched off, the parallax barrier is in its 'on' state. Light 27 passing through the lower polariser is linearly polarised with its electric field direction at 0 degrees. Those rays which pass through the regions A of the wave-plate have their plane of polarisation rotated so that the electric field direction on leaving the wave-plate 22 is 90 degrees. Rays passing through the regions B of the wave-plate 22 are unchanged in polarisation. The switchable wave-plate 23 has no effect in this state, so rays which pass through regions B are absorbed by the upper polariser 25, and rays which pass through regions A are transmitted. The structure therefore acts as a parallax barrier with regions A being transparent and regions B being opaque.

When the wave-plate is switched on, light passing through both sections A and B has its plane of polarisation rotated by the uniform half-wave plate 23 so that, when it reaches the upper polariser 25, its electric field direction forms an angle of 45 degrees with the transmission axis 26 of the polariser 25. The intensity of transmission through sections A and B is therefore the same and the parallax barrier is switched off.

Patterned wave-plates as used in this device can be made in a number of ways using polymerisable liquid crystals, including the chemicals known as 'reactive mesogens'. Details of their fabrication are disclosed in U.S. Pat. No. 6,055,103, EP0887666, U.S. Pat. No. 6,624,863 and EP0887667. EP1047964 discloses details of refinements using multiple retarder layers to improve the variation of properties of the retarders with wavelength.

SUMMARY

According to the invention, there is provided a display comprising: a polarisation modulating layer having a plurality of pixels; a first polariser disposed at a side of a display surface of the polarisation modulating layer; a source of light disposed at a side of a back of the polarisation modulating layer; and a polarisation modifying layer disposed between the source of light and the first polariser and spaced from the polarisation modulating layer. The polarisation modifying layer has at least a first region and a second region. The polarisation modulating layer includes a single pixel or a plurality of pixels and has a first pixel associated with the first region and a second pixel associated with the second region. In each of a first set including the first pixel and the first region and a second set including the second pixel and the second region, each region of the polarisation modulating layer has a same polarisation effect. Between different sets, such as a set including the first pixel and the second region or a set including the second pixel and the first region, each region of the polarisation modulating layer has a different polarisation effect.

The display may further comprise a second polariser between the polarisation modulating layer and the source of light.

The polarisation modulating layer may comprise a liquid crystal layer.

The first region of the polarisation modifying layer may have substantially no polarisation modifying effect.

The second region of the polarisation modifying layer may be arranged to change a polarisation of light passing therethrough by 90°. The second region of the polarisation modifying layer may comprise a polarisation rotator, such as a twisted nematic liquid crystal polarisation rotator.

The display may further comprise a controller arranged to supply, to each pixel, image data modified so as to compensate for the polarisation modifying effect of the polarisation modifying layer. The controller may be arranged to supply, to each pixel, image data representing a difference between a pixel polarisation change for selecting a desired pixel grey level and a polarisation change produced by the polarisation modifying layer.

The display may provide a private viewing mode in which visibility of a displayed image is restricted to a limited region of space sufficient only for a viewer to view the image. The modifying layer may be disablable to provide a public viewing mode in which the displayed image is visible throughout an extended region of space larger than the limited region. In the public viewing mode, the regions of all of the sets may be arranged to have substantially the same polarisation modifying effect, such as substantially no polarisation modifying effect.

The polarisation modifying layer may comprise a liquid crystal layer. The second region of the polarisation modifying layer may comprise a Freedericksz cell with an alignment direction oriented at substantially 45° to a transmission axis of the first polariser. The first region of the polarisation modifying layer may comprise a Freedericksz cell with an alignment direction oriented substantially parallel to a transmission axis of the first polariser.

The polarisation modifying layer may comprise a patterned electrode defining the regions. The polarisation modifying layer may comprise a Freedericksz cell, a twisted nematic layer or a twisted vertically aligned nematic layer.

The polarisation modulating layer may be arranged to output light of substantially linear polarisation for all pixel grey levels. The polarisation modifying layer may comprise a half wave-plate with optic axes which are differently oriented in the regions of the different sets. The modifying layer may be disposed between the polarisation modulating layer and a uniform switchable wave-plate. The polarisation modulating layer may be of an in-plane switching liquid crystal type.

The polarisation modulating layer may be a liquid crystal switchable between substantially vertical and substantially horizontal alignments. The regions of the different sets may provide different retardations.

The pixels of the polarisation modulating layer may be arranged as composite colour groups repeating in a row direction of the display. Each of the regions may be aligned in a viewing direction with a set of the composite colour groups with at least one pixel at each end of the set of composite colour groups being arranged to display a fixed brightness. The fixed brightness may be substantially equal to 50% of the maximum brightness. The at least one pixel may comprise a blue pixel, red and blue pixels, or a composite colour group.

The display may provide an optical decoding mode for viewing encoded image data. The modifying layer may be disablable to provide a plain viewing mode for viewing non-encoded image data.

Such a display may be embodied with only a single optical layer additional to that required for a non-restricted viewing mode so that the display may be relatively thin and the cost of manufacture is relatively low. When used to provide a private viewing mode, privacy is maintained even under relatively low ambient lighting conditions so that it is possible to avoid the disadvantage of many known types of privacy displays, in which leakage of light may make the display readable from a wider range of angles than desired. For displays which are switchable between public and private viewing modes, the brightnesses of both modes are essentially the same.

The polarisation modifying layer may further comprise a third region. The polarisation modulating layer includes a single pixel or a plurality of pixels and has a third pixel associated with the third region. The display may comprise a third set including the third pixel and the third region.

BRIEF DESCRIPTION OF THE DRAWINGS

FIG. 3 is a diagram illustrating a known technique for providing visual cryptography;

FIG. 4 is a diagram illustrating a known type of switchable parallax barrier for an autostereoscopic display;

FIG. 5 is a cross-sectional diagram illustrating a display constituting an embodiment of the invention;

FIG. 6 is a diagram illustrating operation of a display of the type shown in FIG. 5;

FIG. 8 is a diagram illustrating the arrangement of colour pixels for providing increased viewing angle;

FIG. 11 is a cross-sectional diagram illustrating a display constituting an embodiment of the invention;

FIG. 12 is a diagram illustrating viewing angle in a private viewing mode of the display of FIG. 12;

FIG. 13 is a diagram illustrating a display constituting an embodiment of the invention;

FIG. 14 is a diagram illustrating a display constituting an embodiment of the invention;

FIG. 15 is a diagram illustrating the use of compensation films; and

FIG. 16 is a diagram illustrating various pixel shapes.

Like reference numerals refer to like parts throughout the drawings.

DETAILED DESCRIPTION

Figure 1:
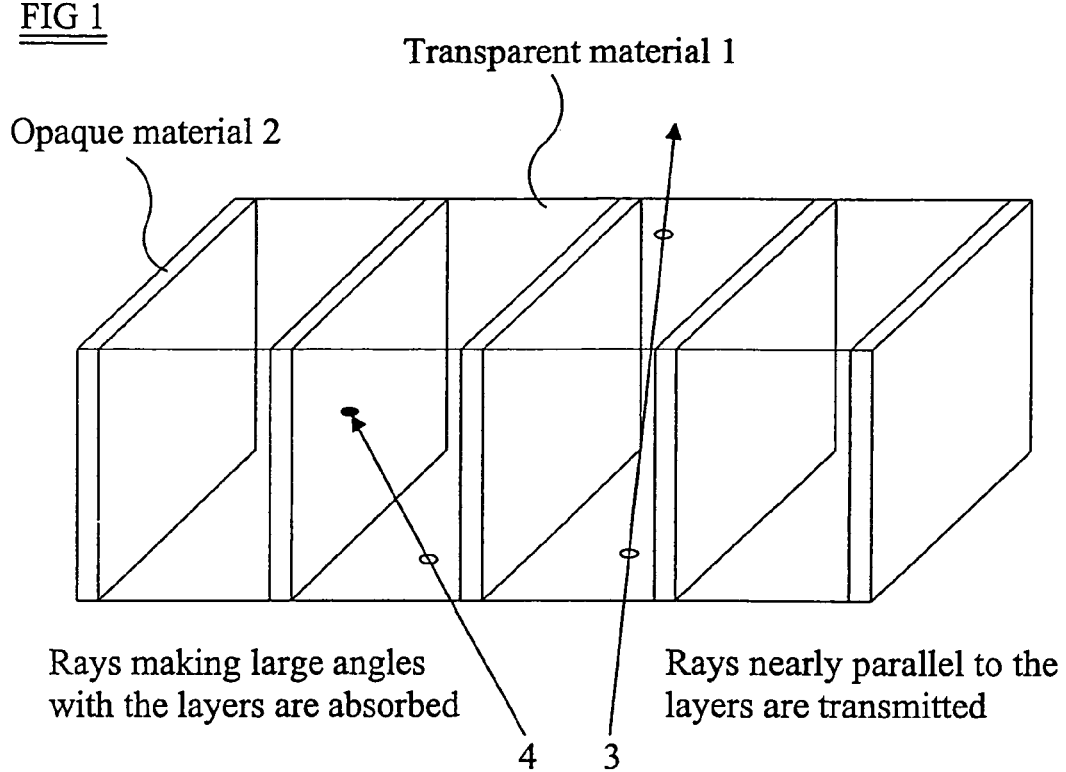
FIGS. 1 and 2 are diagrams illustrating known types of privacy displays.
Figure 2:
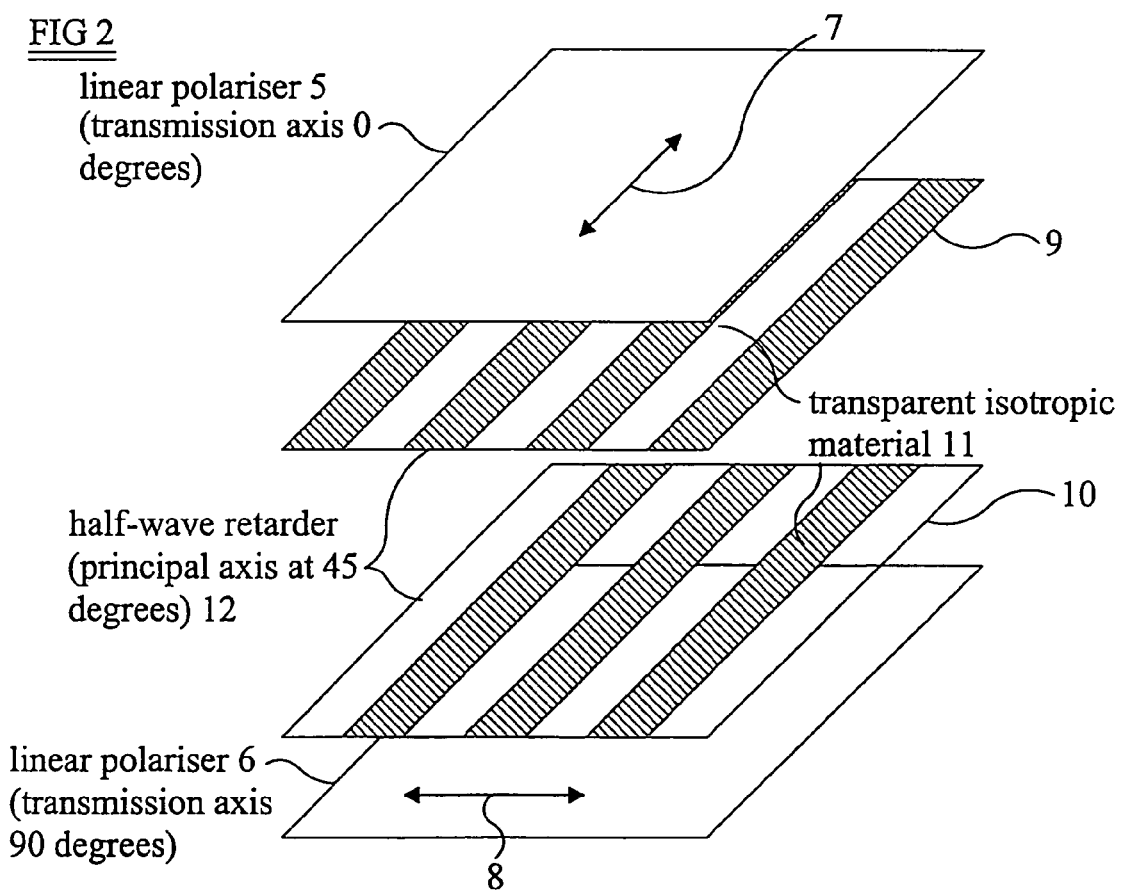

The display shown in FIG. 5 comprises a liquid crystal display panel 30 of the transmissive type and a backlight 31. The display comprises an input polariser (a second polariser) 32 and an output polariser (a first polariser) 33, whose transmission axes are oriented appropriately for the specific type of display panel. For example, the transmission axes may be oriented substantially at 90° to each other. As an alternative, where the backlight 31 supplies linearly polarised light, the polariser 32 may be omitted.

A liquid crystal layer forming display pixels 34 is disposed between the polarisers 32 and 33. The display pixels 34 may be of any suitable type for modulating the polarisation of light from the polariser 32 in accordance with image data supplied by a controller 35. Other elements, such as substrates, alignment layers, electrode layers and colour filters, may be present as appropriate but are not shown in FIG. 5 for the sake of simplicity of illustration. The display pixels 34 thus form a pixellated polarisation modulating layer controlled by the controller 35 so as to convert image grey scale data (either monochrome or colour) into a polarisation modulating effect for modulating the polarisation of light incident from the polariser 32.

A polarisation modifying layer 36 is disposed between the polarisers 32 and 33 and is spaced from the display pixel layer 34 by a distance h. The layer 36 is illustrated as being disposed between the display pixel layer 34 and the output polariser 33 but may alternatively be disposed between the pixel layer 34 and the input polariser 32. Further elements such as birefringent compensation films may also be provided but are not shown in FIG. 5 for the sake of simplicity.

The polarisation modifying layer 36 comprises a plurality of sets of regions with the regions of the different sets being arranged as a one-dimensional or two-dimensional array. In the embodiment illustrated in FIG. 5, there are three sets of regions with regions from the first, second and third sets being illustrated at 37, 38 and 39, respectively. The sets of each region have the same polarisation modifying effect on light from the display pixels 34 but the sets of different regions have different modifying effects. The part of the display between the layers 34 and 36 does not contain any means for polarising light and may therefore be described as a polariser-free light path.

Although three sets of regions 37-39 are illustrated in FIG. 5, the display may comprise any number of sets of regions greater than one. The regions of one of the sets may be arranged substantially not to have any polarisation modifying effect on light from the display pixels 34. In order to provide a public viewing mode, the polarisation modifying layer 36 may be disablable. In such a public mode, the regions 37-39 of the different sets are arranged to have substantially the same polarisation modifying effect, which may be substantially no polarisation modifying effect, on light from the display pixels 34.

In the private viewing mode, the display 30 limits the visibility of an image displayed by the display pixels 34 to a relatively narrow viewing angle sufficient for a viewer who is correctly positioned to see the image but sufficiently narrow substantially to prevent others from seeing the image. Light from the backlight 33 passing through the display 30 must pass through one of the pixels of the layer 34 and through one of the regions 37-39 of the layer 36. Any polarisation modification by the region of the layer 36 affects the apparent brightness of the underlying pixels when viewed through that region. Also, the brightness of any pixel of the layer 34 depends on the type of region 37-39 (i.e. to which set it belongs) through which it is viewed so the pixel brightness depends on the position of the viewer.

The display 30 may be arranged to be viewed from any desired viewing direction in the private viewing mode. Although private viewing will frequently be required from a central position such that the viewer is located substantially on or near a line perpendicular to the centre of ("the normal to") the display, other applications may require a different viewing direction in the private viewing mode. For example, if the display is used in an automotive vehicle and located in a dashboard between a driver position and a passenger position, the viewing angle may be required to be such that the display may only be viewed by the passenger in the private viewing mode, for example so as to avoid distracting the driver or so as to meet legal requirements. The viewing direction will then be at an acute angle to the normal to the display.

In the private viewing mode, the controller 35 controls the display pixels 34 by supplying data which are modified to compensate for the effect of the region of the layer 36 through which the pixels are intended to be viewed. Each region 37-39 is associated with a group of pixels, which group may comprise a single pixel or a plurality of pixels. In the example illustrated in FIG. 5, each region such as 38 is aligned and associated with two pixels such as 40 and 41. The image pixel data to be displayed by the pixels 40 and 41 are thus modified by the controller 35 so as to compensate for the polarisation modifying effect of the region 38 in order for the displayed image to be visible to a viewer located at or adjacent the normal to the display. For example, the controller 35 controls the pixels 40 and 41 to provide a change in polarisation corresponding to the difference between polarisation change which would be required in the absence of the polarisation modifying layer 38 and the polarisation change produced by the region 38. Thus, a viewer viewing the display from a position normal to the display centre sees an uncorrupted image within a restricted region of space.

Because of the separation h between the layers 34 and 36, off-axis viewing of the display results in parallax effects, for example with the pixels 40 and 41 being viewed through the region 37. The compensation of the image data provided by the controller 35 is inappropriate to the polarisation modifying effect produced by the region 37 so that the image displayed in that viewing direction is corrupted in such a way that it is not visible. In particular, the regions 37 to 39 are arranged such that images, such as text, viewed from directions away from the normal to the display are unreadable. It is thus possible to provide a display with a private viewing mode requiring a single additional layer 36 (with associated elements) and capable of maintaining unreadability outside the private viewing region, even in low ambient lighting conditions.

Although the layer 36 may be passive so that its polarisation modifying effects are always present, the layer 36 may be disablable in order to permit switching between public and private viewing modes. When the layer 36 is disabled, it provides a uniform, preferably zero, polarisation modifying effect. The controller 35 supplies uncompensated image data to the display pixels 35 (or provides uniform compensation to all pixels for the residual effects of the layer 36). The modifying layer 36 thus has substantially no effect and the displayed image is visible throughout a wider range of viewing angles and viewer positions.

An example of the display shown in FIG. 5 but comprising two sets of regions is illustrated in FIG. 6. One set of regions is referred to as "non-inverting" and these regions have substantially no effect on the polarisation of light passing therethrough. Such a region is illustrated by the unoccupied squares such as 45 at (a) in FIG. 6. Other regions referred to as "inverting" have the effect of converting vertically polarised light to horizontally polarised light and of converting horizontally polarised light to vertically polarised light. Such a region is illustrated at 46 as a square containing a curved arrow and may, for example, be embodied by a half wave retarder or by a twisted nematic liquid crystal cell. An advantage of using a polarisation modifying layer 36 having only two sets of regions is that fabrication; is simpler and a wide range of well-developed liquid crystal technologies may be used. Also, the liquid crystal mode used in the modifying layer 36 is independent of the liquid crystal mode used in the display pixels 34. In the example illustrated in FIG. 6, it is intended to display the character "X" in black against a white background. The pattern of the array of regions 45 and 46 of the two sets illustrated at (a) is chosen so as to "scramble" the image appropriately when viewed off-axis relative to the display. For example, the pattern may be determined by allowing a random number generator to choose independently whether each element is inverting or non-inverting, each choice being given probability 0.5. The pattern of inverting and non-inverting elements must then be stored for use in displaying the image, as described below. To avoid the need for large amounts of storage, the pattern of a small area of the layer (for example, the 5×5 area shown in the diagram) may be determined randomly, and this small area may be repeated to cover the entire area of the display.

In order to compensate for the inverting regions such as 46 when the display is viewed on-axis, the controller 35 modifies the image data so that, in the absence of the polarisation modifying layer 36, the display would appear as illustrated at (b) in FIG. 6. This results in the image having the appearance illustrated at (c) in FIG. 6 when viewed on-axis. However, when the display is viewed off-axis as illustrated at (d) in FIG. 6, it has the appearance illustrated so that the image is corrupted and the viewer cannot read the "X" which is intended to be displayed.

If more than two sets of regions are used in the modifying layer 36, the effect of the different sets is not limited to either inverting a pixel or leaving it unchanged but includes other possible effects on the displayed grey scale. This has the advantage of improving the level of privacy. For example, in the case of an image comprising black letters on a 50% grey background, where the regions of the different sets invert or leave unchanged the polarisation, viewers outside the intended viewing region in the private viewing mode see the pixels displaying the letter as 50% grey whereas the background appears as a black and white pattern. The letter may therefore be readable outside the intended viewing region. By providing more that two sets of regions with different modifying effects, this may be avoided.

The pattern of regions illustrated at (a) in FIG. 6 may be repeated across the display so as to cover the entire display area.

Figure 7:
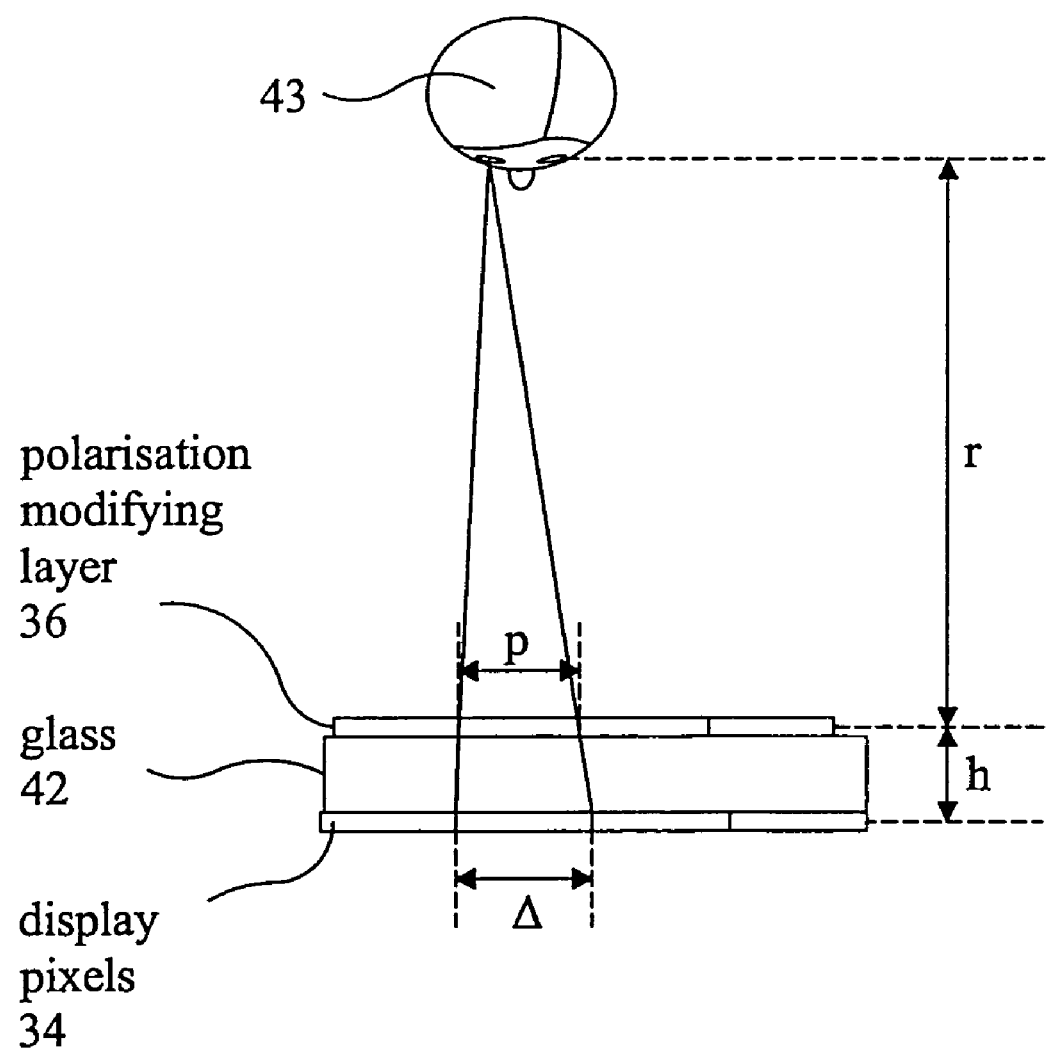
FIG. 7 is a diagram illustrating viewpoint correction.

In order for a viewer at a finite distance r to see the display pixel 34 correctly aligned with the regions of the modifying layer 36, the width p of the regions must be different from the pitch Δ of the pixels or groups of pixels as illustrated in FIG. 7. This requirement, which is known as "viewpoint correction", is well known for parallax barriers as used in 3D displays and in cathode-ray tube displays and is disclosed, for example, by S. H. Kaplan, "Theory of Parallax Barriers", Journal of the SMPTE, vol 59, pp 11-21 (1952). When the layers 34 and 36 are separated by a medium, such as glass 42, having a refractive index n and a thickness h, the ratio of the width p of the regions of the layers 36 and the pitch Δ of the pixels or pixel groups of the layer 34 is given by $$F_f = \frac{p}{\Delta} = \frac{1}{\left(1 + \frac{h}{nr}\right)},$$

where the layer 36 is between the viewer 43 and the layer 34, and $$F_b = \frac{p}{\Delta} = \left(1 + \frac{h}{nr}\right)$$

where the layer 34 is between the layer 36 and the viewer 43.

The layer 36 may be made from liquid crystal in a number of different ways. For example, a Freedericksz cell may be used. In this liquid crystal mode (see, for example, *Liquid Crystal Displays: Addressing Schemes and Electro-optic Effects*, by Ernst Lueder (Wiley-SID Series in Display Technology, 2001)), molecules are aligned horizontally when no field is applied, and the liquid crystal cell is a half-wave plate. When a field is applied, the molecules are oriented vertically (perpendicular to the plane of the panel) and there is no retardance.

In inverting regions, the alignment direction is at 45 degrees to the transmission axes of the polarisers. A half-wave cell with this orientation changes the polarisation state of light passing through it so that horizontally (0 degrees) polarised light becomes vertically polarised and vertically (90 degrees) polarised light becomes horizontally polarised. In non-inverting regions, the alignment direction may be parallel to the transmission axis of one of the polarisers. In this case, horizontally polarised light remains horizontally polarised and vertically polarised light remains vertically polarised. The non-inverting regions then have no effect on the brightness of pixels viewed through them.

This arrangement has the advantage that the layer can be fabricated using known methods for patterning the alignment layer of a liquid crystal cell. These are described, for example, in U.S. Pat. No. 6,055,103, EP0887666, U.S. Pat. No. 6,624, 863, EP0887667 and US patent application US20030137626 (M. Khazova; Sharp K. K. 2003).

Alternatively, non-inverting regions may contain a transparent material that is not birefringent in place of the liquid crystal. This has the advantage that the non-transparent regions may be made by patterning a photo-resist layer using methods that are well known (see, for example, Microfabrication, by S. Franssila: Wiley (2004)).

Alternatively, the entire additional layer may consist of a Freedericksz cell with the alignment direction at 45 degrees to the polarisation axis. In this case, the electrode on one side of the cell is patterned so that voltage is applied at all times to the non-inverting regions. Voltage is not applied to the inverting regions when the display is in its private mode. When the display is switched to its public mode, voltage is applied to all regions. This has the advantage that only patterning of the electrode is required; this is a simpler process than processing of a resist layer or of a multi-direction alignment layer.

Instead of the Freedericksz mode, the well-known twisted nematic (TN) mode may be used (see, for example, *Liquid Crystal Displays: Addressing Schemes and Electro-optic Effects,* by Ernst Lueder (Wiley-SID Series in Display Technology, 2001)). The effect of the TN cell is to rotate the plane of polarisation of light so that the pixel is inverted as above. For example, a 90° polarisation rotation may be obtained for any twist angle of the liquid crystal (see, for example, GB2390170). When voltage is applied to the cell, the effect is switched off. If a TN cell is used, non-inverting regions may either be non-birefringent material or be switched to the non-inverting state by applying voltage, as described above for the Freedericksz mode, with the advantages as described above.

The 90-degree TN mode has the advantages that it has been highly developed for other display applications and that it can be operated in regimes where it is substantially achromatic, so that problems with colour in the display are avoided. Examples of such regimes are the first few Gooch-Tarry minima and the Mauguin limit. Details of these regimes are given, for example, by P. Yeh and C. Gu in *Optics of liquid crystal displays* (Wiley 1999).

Alternatively, the twisted vertically-aligned nematic (T-VAN) mode may be used. This mode is described in EP1103840. In this case, the liquid crystal cell has a twisted structure and rotates the polarisation state when voltage is applied and is vertically aligned and does not affect polarisation when no voltage is applied. The polarisation modifying layer 36 therefore consumes electrical power in the private mode and not in the public mode. This is an advantage for portable devices where power economy is important and the device is used more often in its public mode than in its private mode.

The examples of liquid crystal modes given above are for the case where the layer 36 has two sets of regions: inverting and non-inverting.

Liquid crystal cells may also be used to provide a layer 36 with more than two sets of regions. However in this case, only certain types of liquid crystal display layers 34 may be used. All these methods have the advantage that the level of privacy provided is high: for example the black and grey image described above will appear unreadable to unwanted viewers because not all regions map 50% grey pixels to 50% grey pixels.

In a first method of this type, the display pixel 34 must be of a type in which the light exiting the liquid crystal layer has a polarisation state which is linear or close to linear for every greyscale setting. An example of such a display panel is one using the in-plane switching mode (M. Oh-e et al, *Digest Asia display* 1995 p. 577; M. Ohta et al, *Digest Asia display* 1995 p. 68). The layer 36 comprises a number of regions, each of which is a liquid-crystal half-wave plate. The orientations of the principal axes of the wave-plates vary among the sets of regions. As before, the data sent to the pixels 34 is modified by the controller 35 to compensate for the effect of the regions through which pixels are seen by a centrally located viewer and parallax effects cause the image to appear corrupted to off-axis viewers.

In a second method of this type, the display panel 30 is one in which each liquid crystal pixel may be switched between a state where it is largely vertically aligned and a state where it is horizontally aligned and forms a half-wave retarder. Examples of such modes are the Freedericksz mode, the vertically aligned nematic (VAN) mode and the pi cell. Details of these modes are given, for example, in the book by Yeh and Gu mentioned above. In this method, the layer 36 comprises regions which have varying retardation but share the same principal axis.

This may be achieved by a layer 36 which comprises a nematic liquid crystal cell. A patterned alignment layer provides a vertical alignment angle (also known as the pre-tilt angle) that varies among the regions of the layer 36. The azimuthal angle (the projection of the alignment direction into the plane of the display) is the same for all regions. The cell gap is set so that, when the pre-tilt angle is close to zero, the cell is a half-wave retarder. Larger values of the pre-tilt angle result in smaller retardation: for example a 60 degree tilt may give a quarter-wave retarder and a 90-degree tilt a layer with no retarding effect. Again, data sent to the display panel 30 by the controller 35 takes account of the effect of the layer 36 for a centrally located viewer.

In an alternative arrangement, also making use of the same range of display panel types, the layer 36 again comprises regions which have varying retardation. The principal axes of all the regions is the same. All regions are liquid crystal cells with the same alignment direction, but with differing thicknesses.

In a further alternative arrangement, also making use of the same range of display panel types, the layer 36 again comprises regions which have varying retardation and the same principal axis. All regions have the same thickness and all are half-wave retarders when no voltage is applied. In the private mode, the voltage applied to cells varies among the regions and this causes the retardation to vary among the regions.

This does not exhaust the possible liquid crystal modes which may be used in the polarisation-modifying layer 36. Many other modes are well known and might equally be applied (see, for example, the books by Lueder and by Yeh and Gu mentioned above).

The thickness of the liquid crystal cell in the layer 34 may be chosen so that each pixel can switch between values of retardation from zero up to a value greater than half a wavelength (for example, a whole wavelength). The advantage of this modification is that it increases the range of grey levels which can be reached in the private mode.

Some liquid crystal modes may not perform in exactly the same way for all wavelengths of visible light either in the public or the private modes. The data sent to the display may be adjusted to compensate for these differences. For example, a different look-up table (i.e. a different assignment of voltages to greyscales) may be used for different coloured pixels.

In addition to the polarisation-modifying layer 36, additional layers of birefringent material may be applied to act as compensation films 70 to 76, as shown in FIG. 15. The concept of a compensation film is well known in the field of liquid crystal displays (P. Yeh and C. Gu, *Optics of liquid crystal displays* (Wiley 1999; U.S. Pat. No. 5,196,953)). The birefringence of the compensation films 70, 73 shown at (a) in FIG. 15 cancels the birefringence of the bulk 77 of the polarisation-modifying layer 36 in the switched state and the performance at higher viewing angles is greatly improved. The birefringent layers 71 and 72 may also be added to compensate for the layers, such as 78 of liquid crystal close to the interface, which remain horizontally aligned. This further improves off-axis performance (see Yeh and Gu). As shown at (b) in FIG. 15, the additional layers 74 to 76 may be arranged between the polarisation-modifying layer 36 and the linear polariser (33) closer to it. The advantage of this arrangement is that it minimises the separation h between the polarisation-modifying layer 36 and the display pixels 34, and so maximises the viewing angle of the display in its private mode.

An issue which may arise is that, with the pixel size and glass thickness of a typical display, the range of angles from which the display can be read in its private mode is very small, in fact, not large enough to accommodate both eyes of the viewer. Two possible methods of dealing with this will be described.

The first method is used for colour displays where the pixels are arranged in sets of three colour sub-pixels, with a red (R), a green (G) and a blue (B) pixel in each set, as shown at (a) in FIG. 8. This can be used only in the case where the regions in the layer 36 are of two types, namely inverting and non-inverting.

The method takes advantage of two facts. Firstly, if a display pixel is set to approximately 50% brightness, then its appearance is the same through inverting and non-inverting regions. Secondly, the human visual system is less sensitive to fine detail in blue than in other colours (see J. S. Wolffsohn et al, 'Contrast is enhanced by yellow lenses because of selective reduction of short-wavelength light' *Optometry and Vision Science* vol 77(2) pp 73-81 (2000), R. Martin et al, 'Detectability of reduced blue pixel count in projection displays', *Proceedings of the Society for Information Display*, vol 24, pp 606-609 (1993), WO 02/091299).

In the private mode, half the blue pixels, namely those marked 'H' at (b) in FIG. 8, are set to 50% brightness. Each inverting or non-inverting region in the display covers six colour sub-pixels. When the viewer is in the central position, the left- and right-hand edges of the regions are located over the centres of the blue 50% pixels, as shown at (c) in FIG. 8.

From this starting point, if the viewing position moves to the left or to the right, there is no change in the appearance of the display. This is because the only pixels moving from inverting to non-inverting regions are at 50% brightness and so have unchanged appearance. For example, if the user's head moves far enough to the left so that the display appears as shown at (d) in FIG. 8, the apparent colours of all areas of the display are the same as at (c). The appearance of the display changes only when the viewpoint moves far enough so that the apparent position of the boundaries between inverting and non-inverting regions has shifted into pixels which are not at 50% brightness.

This scheme has the advantage that the region from which the display is clear is enlarged so that a user can see it with both eyes at the same time. Because only half the blue pixels are used to carry information, the effective resolution of the display for blue detail is halved. However, this is typically not noticeable because of the eye's lower acuity in the blue.

In the description above, one blue pixel in two was set at 50% to increase viewing freedom. It is also possible to use one blue pixel in three or more, depending on the resolution of the display panel and the viewing angles required. Other combinations of colour pixels may also be used. For example a blue and a red pixel every six colour sub-pixels may be set to 50%. Alternatively, a set of three colour sub-pixels, together forming a composite colour or 'white' pixel group may be set to 50%. This last option has the advantage of leaving the colour balance of the display unaffected.

A second method of increasing the display viewing angle is applicable only when the original display has a particular property. The polarisation state of light as it exits the liquid crystal (before it passes through the exit polariser) must be linear. An example of a liquid crystal mode having this property is the in-plane switching mode used in some liquid crystal televisions (see the book by Lueder for details).

Figure 9:
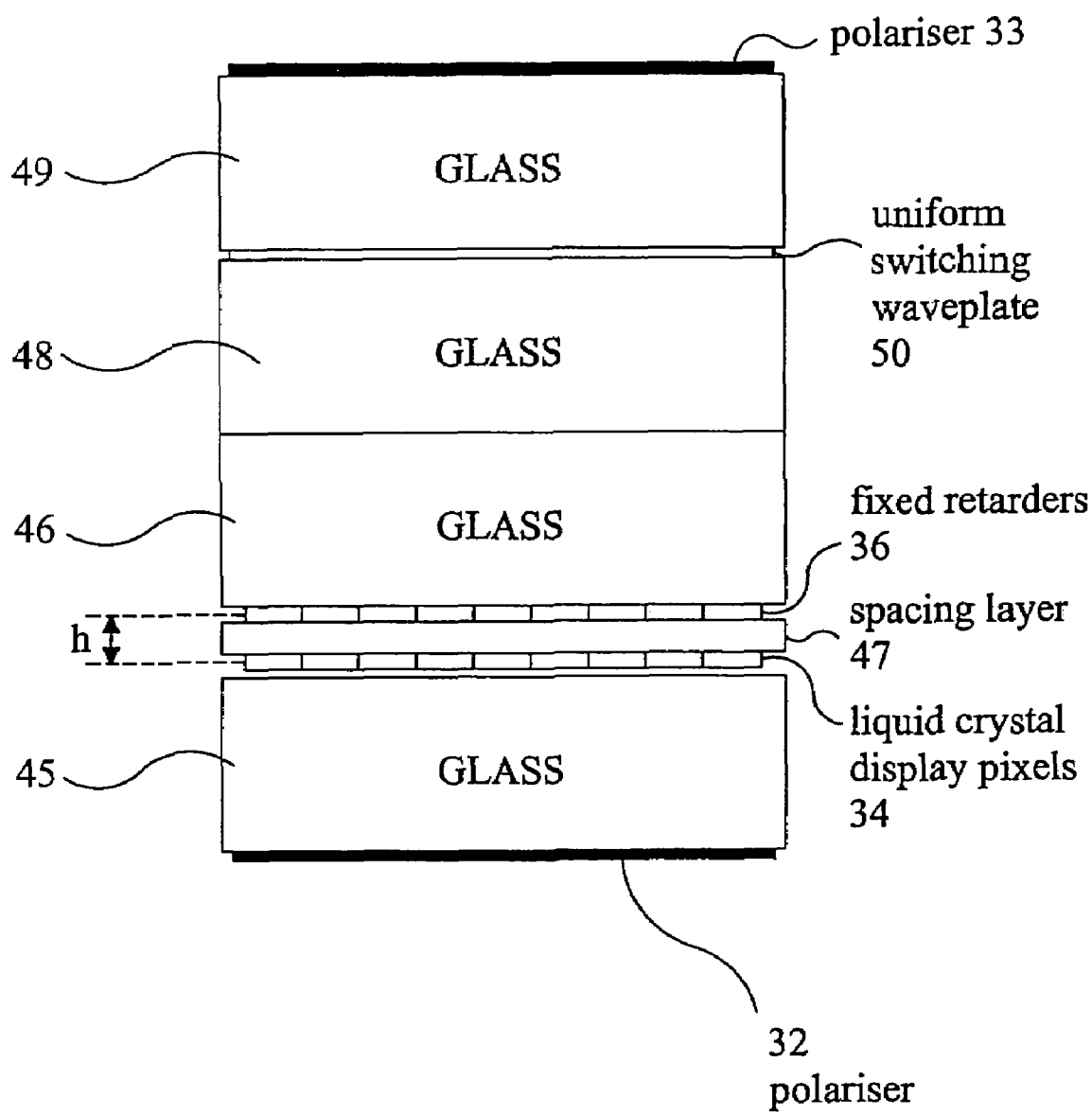
FIG. 9 is a cross-sectional diagram illustrating a display constituting an embodiment of the invention.

An example of a display using this method is illustrated in FIG. 9. The polarisation modifying layer 36 comprises fixed retarders and is disposed together with the liquid crystal display pixel layer 34 between glass substrates 45 and 46. The layers 34 and 36 are separated by a spacing layer 47 to provide the separation h.

A further device is disposed between the glass substrate 46 and the polariser 33 and comprises a uniform switching wave plate 50 disposed between further glass substrates 48 and 49.

Figure 10:
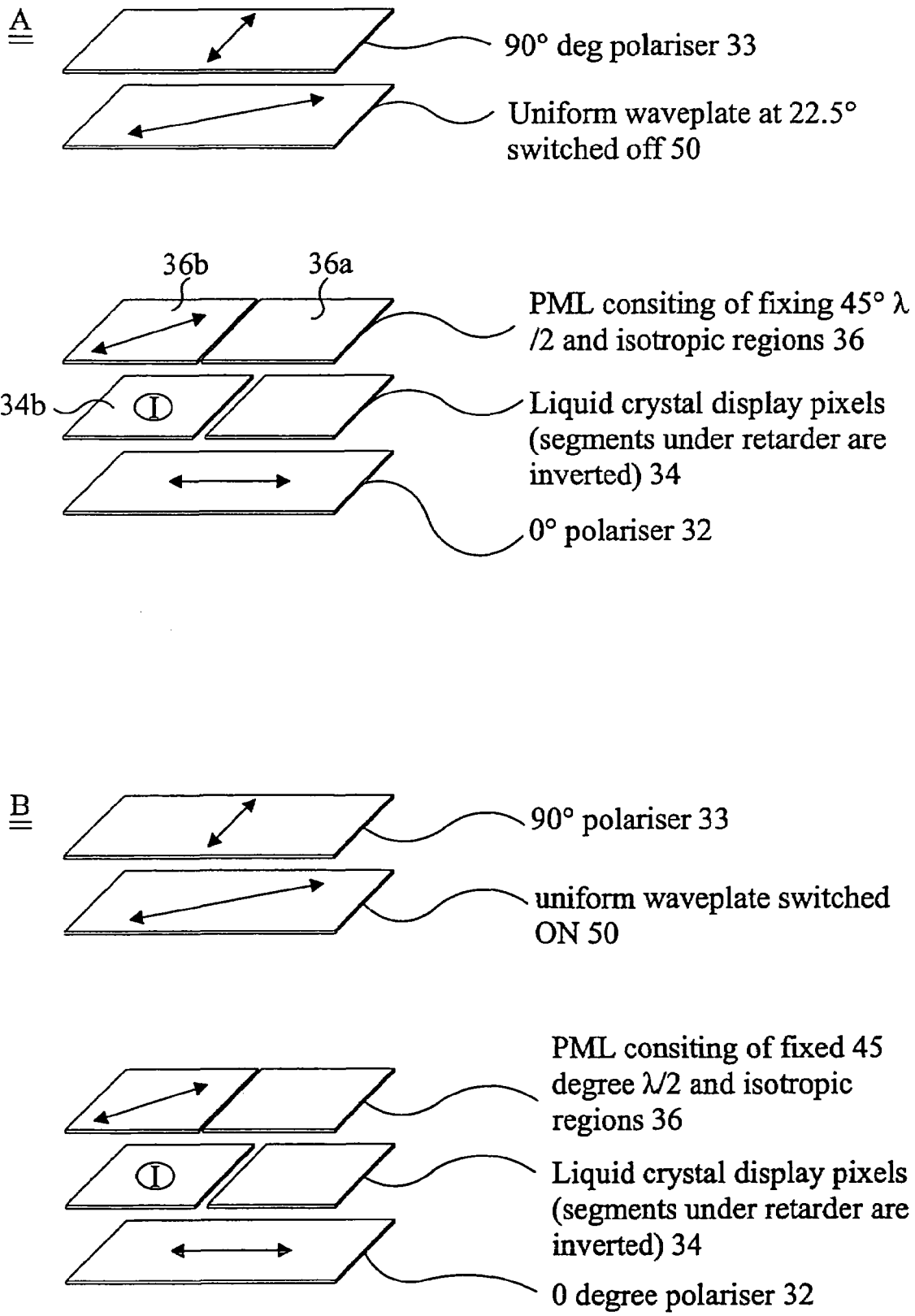
FIG. 10 is a diagram illustrating operation of the display of FIG. 9.

The structure and operation of a display of this type is illustrated in FIG. 10. The polarisers 32 and 33 have orthogonal transmission axes. The layer 36 comprises isotropic regions such as 36a and half wave plates such as 36b whose axes are oriented at 45° to the polariser transmission axes. Pixels such as 34b aligned with the wave plates 36b are supplied with "inverted data" to compensate for the effect of the wave plate in the privacy mode.

The uniform wave plate 50, when switched on, has an optic axis oriented at 22.5° to the transmission axis of the polariser 32. When the wave plate 50 is switched off, it has substantially no optical effect.

As shown at (a) in FIG. 10, when the wave plate 50 is switched off, the display operates in the private viewing mode as described hereinbefore. As illustrated at (b) in FIG. 10, when the wave plate 50 is switched on, the display operates in the public mode. The distance h between the layers 34 and 36 determines the viewing angle in the private viewing mode whereas the distance from the wave plate 50 to the other layers is not relevant to this and may be arbitrarily chosen, for example, to accommodate the two substrates 46 and 48 as shown in FIG. 9. By using a relatively thin spacing layer 47, the distance h between the layers 34 and 36 may be reduced so as to increase the angle of viewing freedom in the private viewing mode to allow comfortable viewing by the viewer. This technique increases the viewing angle without any reduction in resolution or contrast of any colour.

The ordering of layers between the display substrates when this method is used may be TFT substrate, in-cell retarders, spacer, liquid crystal, colour filters, colour filter substrate. This has the advantage that the colour filters may be added to the colour filter substrate in a separate processing step before the other optical elements are added.

Alternatively, the ordering of layers may be TFT substrate, liquid crystal, colour filters, spacer, in-cell retarders, colour filter substrate. This has the advantage that the in-cell retarder is placed on the colour filter substrate, which is typically flatter (and therefore a better base for alignment layers) and also less fragile than the TFT substrate.

Alignment layers and electrodes, though present in the device, are omitted from these lists.

The shape of pixels in the display panel may be modified to affect the way in which the display moves from being readable to being unreadable. For example, if the opaque regions such as 51 of each pixel are positioned along the vertical edges of the pixel as shown at (a) in FIG. 16, then the user of the display will have the maximum horizontal head freedom within the region where the display is readable. This may be preferable to the situation where the opaque regions 51 occupy the horizontal edges as shown at (b) in FIG. 16. Alternatively, the pixels may be diamond-shaped as shown at (c) in FIG. 16. In this case, for small displacements of the user's head, the amount of pixel exposed grows with the square of the displacement rather than linearly. This may lead to improved viewing characteristics.

In all embodiments, the optical behaviour of the layer 36 may depend upon the wavelength of light passing through it. Different colours may therefore be affected differently by the regions of the layer 36. This may lead to colour defects or a reduced colour gamut for the display. These effects may be reduced by using a different look-up table (a different mapping from the desired pixel brightness to the applied voltage) for each primary colour and for each type of region. The look-up tables are optimised to make the colour reproduction of the display as faithful as possible.

The regions in the layer 36 may be vertical stripes. In this case only horizontal movement of the viewer's head affects the appearance of the display. Alternatively, the regions in the layer 36 may be limited in both vertical and horizontal directions, so that both vertical and horizontal motion of the viewer's head affects the appearance of the display.

Such displays may also be used as an optical decoding device for a secure information system. In this application, the action of each region of the layer 36 (inverting, non-inverting or some other polarisation modifying element) is determined by a random or pseudo-random procedure and is different for each pixel in the display. The configuration of the layer 36 is recorded at an information source and used to determine the data sent over a non-secure channel to the display. The information on the display cannot be read unless the correct layer 36 is placed over it.

An advantage of this method over other cryptographic schemes is that the private information cannot be inferred by unwanted readers even if they have access to all information passing through the terminal. The scheme can therefore be used when the terminal is not secure.

FIG. 11 illustrates a display in which the layer 36 comprises Fredeerickz liquid crystal cells, such as 55, separated by photoresist spacers, such as 56, which are isotropic. From the side of the backlight 31, the layers of the device are arranged in the order: linear polariser 32 with transmission axis oriented at 0°; a glass substrate 45; the liquid crystal display pixel layer 34 with pixels separated by black mask regions 57; a glass substrate 46; a glass substrate 48; the polarisation modifying layer 36 comprising the liquid crystal retarders 55 and the isotropic photoresist spacers; a glass substrate 49; and a polariser 33 whose transmission axis is oriented at 90°. The optic axes of the retarders 55 are oriented at 45°. The operation of such a device has been described hereinbefore and will not therefore be described further.

FIG. 12 illustrates the lateral viewing freedom f of the display shown in FIG. 11. The lateral viewing freedom f is the width of the region from which the image displayed by the display appears uncorrupted in the private viewing mode. For comfortable viewing in this mode, f should be greater than the separation of the eyes of a viewer, which is typically of the order of 60 mm.

FIG. 12 illustrates how f depends upon the viewing distance r, the width b of the black mask regions in the display, the separation h between the two layers and the refractive index n of the material separating the two layers. FIG. 12 shows rays AA' and BB' which pass through the display, one touching either end of a black mask region 57 with both rays passing through the same point on the boundary between two regions in the layer 36. Where these rays pass through the plane 60 containing the viewer, they are separated by a distance equal to the viewing freedom f.

The angle between the rays in the material separating the layer 34 and the layer 36 is $\alpha$ and the corresponding angle in the air is $\beta$. The small angle approximation is sufficiently accurate for estimating f for the values of these parameters considered here. In this approximation, $\alpha=b/h$ and $\beta=f/r$ and, from Snell's law, $\beta=n\alpha$. so that $f=nbr/h$.

Examples of possible values for these parameters are $n=1.52$, $b=0.025$ mm and $h=1$ mm. Even with this large value of b, the viewing freedom f does not reach 60 mm until the viewer moves as far away as $r=1600$ mm. At shorter viewing distances, f is smaller and so the display cannot be viewed comfortably in the private mode.

The techniques described hereinbefore for increasing the lateral viewing freedom f may be applied to the display shown in FIG. 11.

The display of FIG. 11 may also be used for displaying secure data as described hereinbefore. In this case, the layer 36 need not be switchable. Thus, no electrode is necessary and the liquid crystal in the layer 36 may be a fixed material such as a polymerisable liquid crystal.

The layer 36 need not be fixed to the display but may be carried separately and located on the display when needed. The pattern of inverting and non-inverting layers in the layer 36 is chosen by a random or pseudo-random method and recorded at the information source so that it can be used to encode images which are then sent over an insecure communication channel.

The display shown in FIG. 13 differs from that shown in FIG. 11 in that the layer 36 comprises a twisted nematic liquid crystal layer provided on one side with a uniform electrode 61 and on the other side with a patterned electrode 62. Also, a compensating film 63 is disposed between the substrate 49 and the polariser 33.

The patterned electrode 62 is shown at (b) in FIG. 13 and defines the sets of regions A and B. The regions of each set are connected together electrically so that different voltages can simultaneously be applied to the two sets of regions. Thus, one set of regions of the non-inverting type are effectively created by applying a suitable voltage to one of the electrodes of the patterned electrode 62 so that the liquid crystal molecules adjacent that electrode remain vertical and do not rotate the plane of polarisation of light. The other electrode is connected to zero voltage for the private viewing mode and to the same voltage as the first electrode for the public viewing mode so that the associated liquid crystal regions are switched between a polarisation rotation mode and a non-rotation mode.

By using the technique described hereinbefore with reference to FIG. 8, the region from which the display is clear is enlarged so that a user can see it with both eyes at the same time. The equation for the viewing freedom given above becomes $f=n(\Delta+b)r/h$. This makes the device practical for use with high-resolution displays and normal glass thickness. For example, a display for a notebook computer might have n=1.52, Δ=0.1 mm, b=0.01 mm, r=500 mm. If the display substrate glass is 0.7 mm thick and the glass used for the layer 36 is 0.5 mm thick, then h=1.2 mm. The value of f is then 70 mm.

Because only half the blue pixels are used to carry information, the effective resolution of the display for blue detail is halved: however this is typically not noticeable because of the eye's lower acuity in the blue.

Electrode A covers an area equivalent to the inverting area shown at (a) in FIG. 6, repeated six times over the area shown. In a real device, there will be many more repeating units but the layout of each will be the same. The horizontal cell width p is approximately six times the pixel pitch Δ of the display panel. In fact, p=6 $F_f$Δ, where $F_f$ is the viewpoint correction factor discussed above. The vertical cell width q may be any multiple of the viewpoint-corrected pixel height: in the example here, it is approximately equal to p.

In the private mode of the display, the contrast of the displayed image at large (oblique) viewing angles is unimportant, because viewers at these angles cannot read information on the display. However, in the public mode, it is desirable to make the contrast high and uniform across a wide range of viewing angles. The presence of a vertically oriented liquid crystal layer in the layer 36 causes contrast to deteriorate at high viewing angles. This is because it has positive birefringence, the principal axis being normal to the display plane. This layer has no effect on the polarisation of normally incident light, but may change the polarisation state of light entering the layer at other angles. In the public mode, the layer 36 should have no effect on the polarisation of light so that any such change will have the effect of damaging the performance of the display at higher viewing angles.

To remove this problem, the compensation film 63 is disposed between the layer 36 and the upper polariser 33. This layer 63 again has the principal axis normal to the display, but has negative birefringence. The product of thickness and birefringence d|Δn| are equal for the layer 36 and the compensating film 63. The birefringence of the compensating film 63 then exactly cancels the birefringence of the polarisation-modifying layer 36 in the switched state, so that the performance at higher viewing angles is greatly improved.

Such compensating films are well known in their application to improving the viewing angle characteristics of liquid crystal display panels (P. Yeh and C. Gu, *Optics of liquid crystal displays* (Wiley 1999); U.S. Pat. No. 5,196,953). These references also describe how additional birefringent layers may be added to compensate for the layers of liquid crystal close to the interface, which remain horizontally aligned. This further improves off-axis performance. Such additional layers may also be included.

The paper 'Achromatic polarization switch using a film-compensated twisted nematic liquid crystal cell', by Q. -H. Wang et al, (*Liquid Crystals* vol 31, 535-9 (2004)) describes an implementation of a polarisation rotating element where compensating films have been optimised to improve the performance.

In the embodiment described above, the twisted nematic (TN) mode is used. Alternatively, the twisted vertically-aligned nematic (T-VAN) mode may be used. This mode is described in EP1103840. In this case, the liquid crystal cell has a twisted structure and rotates the polarisation state when voltage is applied, and is vertically aligned and does not affect polarisation when no voltage is applied. The polarisation modifying layer 36 therefore consumes electrical power in the private mode and not in the public mode. This is an advantage for portable devices where power economy is important and the device is used more often in its public mode than in its private mode.

FIG. 14 illustrates at (a) a display in which the layer 36 has three types of region, each having a different effect on the polarisation state of light. The liquid crystal display panel 34 used is the vertically aligned nematic (VAN) type, with each pixel acting as a three-quarter-wave plate in the voltage-on state and having no effect on the polarisation of normally incident light in the voltage-off state. Linear polarisers 32 and 33 with axes perpendicular to one another and at 45 degrees to the alignment directions of the layer 34 are placed above and below the structure.

The layer 36 is a Freedericksz liquid crystal cell. The electrode 61 on one substrate 48 of the cell is uniform. On the other substrate 49, the electrode 62 is patterned so that it has three electrically disconnected regions. As shown at (b) in FIG. 14, a small section of the electrode 62 has the different regions marked A, B, C. Each rectangle in the electrode 62 covers six colour sub-pixels in the layer 34.

The alignment direction of the liquid crystal in the layer 36 is perpendicular to the alignment direction of the liquid crystal in the layer 34. The cell thicknesses and material properties are chosen so that, when a display pixel is switched to the state where it is effectively a half-wave retarder and the adjacent region of the layer 36 has no voltage applied, the region exactly compensates for the birefringence of the display panel.

In the public mode, voltage is applied to all electrodes so that the layer 36 has little effect on the polarisation of light passing through it. The display functions as if the layer 36 were not present, with each pixel in the display being supplied with a voltage which causes it to act as a retarder with a retardance between zero (giving a black pixel) and half a wavelength (giving a bright pixel).

In the private mode, the voltages applied to the three different regions are different. The voltages are chosen so that region A acts as a half-wave plate, the region B acts as a ¼ wave plate, and the region C has substantially no effect on the polarisation of light.

For a viewer located centrally, the effect of the layer 36 in this state is to change the mapping between the state of the pixels in the display and the grey level seen by the viewer. The effective retardation of a pixel seen through its associated region is simply the difference between the retardation of the two elements. For example, a half-wave retarder in the display combined with a perpendicular one-quarter wave retarder in the layer 36 is equivalent to a single one-third wave retarder. The transmission of a retarder with fraction f of a whole wave between crossed polarisers and with the principal axis at 45 degrees to the polariser axis is $\sin^2(\pi f)$.

The table below summarises this effect for the display described above.

| | | Relative brightness of pixels | | |
|---|---|---|---|---|
| | | Action of region in PML | | |
| | | no effect | ¼ wave retarder | ½ wave retarder |
| Action of display pixel | no effect | 0% | 50% | 100% |
| | ¼ wave retarder | 50% | 0% | 50% |
| | ½ wave retarder | 100% | 50% | 0% |
| | ¾ wave retarder | 50% | 100% | 50% |

Because each display pixel can vary its retardance between 0 and ¾ wave, in the private mode, the data sent to the pixels of the layer 34 can be adjusted so that a centrally located viewer will see an uncorrupted image. As in previous embodiments, off-axis viewers will see a corrupted image because of parallax effects.

What is claimed is:

1. A display comprising:
a polarisation modulating layer having a plurality of controllable pixels;
a first polariser disposed at a side of a display surface of the polarisation modulating layer;
a source of light disposed at a side of a back of the polarisation modulating layer; and
a polarisation modifying layer disposed between the source and the first polariser and spaced from the polarisation modulating layer,
wherein:
the polarisation modifying layer has at least a first region and a second region,
the polarisation modulating layer includes a single pixel or a plurality of pixels and has a first pixel associated with the first region and a second pixel associated with the second region,
in each of a first set including the first pixel and the first region and a second set including the second pixel and the second region, each region of the polarisation modulating layer has a same polarisation modifying effect, and
between different sets, such as a set including the first pixel and the second region or a set including the second pixel and the first region, each region of the polarisation modulating layer has a different polarisation modifying effect.

2. A display as claimed in claim 1, further comprising a second polariser between the polarisation modulating layer and the source of light.

3. A display as claimed in claim 1, wherein the polarisation modulating layer comprises a liquid crystal layer.

4. A display as claimed in claim 1, wherein the first region of the polarisation modifying layer has substantially no polarisation modifying effect.

5. A display as claimed in claim 4, wherein the first region of the polarisation modifying layer comprises a Freedericksz cell with an alignment direction oriented substantially parallel to a transmission axis of the first polariser.

6. A display as claimed in claim 1, wherein the second region of the polarisation modifying layer is arranged to change a polarisation of light passing therethrough by 90°.

7. A display as claimed in claim 6, wherein the second region of the polarisation modifying layer comprises a retarder.

8. A display as claimed in claim 6, wherein the second region of the polarisation modifying layer comprises a polarisation rotator.

9. A display as claimed in claim 8, wherein the polarisation rotator is a twisted nematic liquid crystal polarisation rotator.

10. A display as claimed in claim 6, wherein the second region of the polarisation modifying layer comprises a Freedericksz cell with an alignment direction oriented at substantially 45° to a transmission axis of the first polariser.

11. A display as claimed in claim 1, further comprising a controller arranged to supply, to each pixel, image data modified so as to compensate for the polarisation modifying effect of the polarisation modifying layer.

12. A display as claimed in claim 11, wherein the controller is arranged to supply, to each pixel, the image data representing a difference between a pixel polarisation change for selecting a desired pixel grey level and a polarisation change produced by the polarisation modifying layer.

13. A display as claimed in claim 1, wherein the display provides a private viewing mode in which visibility of a displayed image is restricted to a limited region of space sufficient only for a viewer to view the image.

14. A display as claimed in claim 13, wherein the polarisation modifying layer is disablable to provide a public viewing mode in which the displayed image is visible throughout an extended region of space larger than the limited region.

15. A display as claimed in claim 14, wherein, in the public viewing mode, the regions of all of the sets are arranged to have substantially a same polarisation modifying effect.

16. A display as claimed in claim 15, wherein, in the public viewing mode, the regions of all of the sets are arranged to have substantially no polarisation modifying effect.

17. A display as claimed in claim 1, wherein the polarisation modifying layer comprises a liquid crystal layer.

18. A display as claimed in claim 17, wherein the polarisation modifying layer comprises a patterned electrode defining the regions.

19. A display as claimed in claim 18, wherein the polarisation modifying layer comprises a Freedericksz cell, a twisted nematic layer, or a twisted vertically aligned nematic layer.

20. A display as claimed in claim 1, wherein the polarisation modulating layer is arranged to output light of substantially linear polarisation for all pixel grey levels.

21. A display as claimed in claim 20, wherein the polarisation modifying layer comprises a half wave plate having optic axes which are differently oriented in the regions of the different sets.

22. A display as claimed in claim 21, wherein the polarisation modifying layer is disposed between the modulating layer and the half wave plate.

23. A display as claimed in claim 20, wherein the polarisation modifying layer is of an in-plane switching liquid crystal type.

24. A display as claimed in claim 20, wherein the polarisation modifying layer is a liquid crystal switchable between a substantially vertical alignment and a substantially horizontal alignment.

25. A display as claimed in claim 24, wherein the regions of the different sets provide different retardations.

26. A display as claimed in claim 1, wherein the pixel of the polarisation modulating layer is disposed as a composite colour group which is repeated in a row direction of the display.

27. A display as claimed in claim 26, wherein each of the regions is aligned in a viewing direction using a set of a composite colour group (R, G, B) with at least one pixel at each end of a set of the composite colour group being arranged to display a fixed brightness.

28. A display as claimed in claim 27, wherein the fixed brightness is substantially equal to 50% of a maximum brightness.

29. A display as claimed in claim 27, wherein the at least one pixel comprises a blue pixel (B).

30. A display as claimed in claim 27, wherein the at least one pixel comprises red and blue pixels (R, B).

31. A display as claimed in claim 27, wherein the at least one pixel comprises a composite colour group (R, G, B).

32. A display as claimed in claim 1, wherein the display provides an optical decoding mode for viewing encoded image data.

33. A display as claimed in claim 32, wherein the polarisation modifying layer is disablable to provide a plane viewing mode for viewing non-encoded image data.

34. A display as claimed in claim 1, wherein:

the polarisation modifying layer further comprises a third region, and the polarisation modulating layer includes a single pixel or a plurality of pixels and has a third pixel associated with the third region, and the display comprises a third set including the third pixel and the third region.

* * * * *